US011611491B2

(12) United States Patent
Smith et al.

(10) Patent No.: US 11,611,491 B2
(45) Date of Patent: Mar. 21, 2023

(54) EDGE COMPUTING SERVICE GLOBAL VALIDATION

(71) Applicant: Intel Corporation, Santa Clara, CA (US)

(72) Inventors: Ned M. Smith, Beaverton, OR (US); Ben McCahill, Santa Clara, CA (US); Francesc Guim Bernat, Barcelona (ES); Felipe Pastor Beneyto, Holmdel, NJ (US); Karthik Kumar, Chandler, AZ (US); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 16/235,159

(22) Filed: Dec. 28, 2018

(65) Prior Publication Data

US 2019/0140919 A1 May 9, 2019

Related U.S. Application Data

(60) Provisional application No. 62/656,682, filed on Apr. 12, 2018.

(51) Int. Cl.
*H04L 41/5009* (2022.01)
*H04L 67/10* (2022.01)
(Continued)

(52) U.S. Cl.
CPC ...... *H04L 41/5009* (2013.01); *H04L 41/5019* (2013.01); *H04L 67/10* (2013.01); *H04L 67/51* (2022.05); *H04L 67/12* (2013.01)

(58) Field of Classification Search
CPC . H04L 41/5009; H04L 41/5019; H04L 67/10; H04L 67/16; H04L 67/51
See application file for complete search history.

(56) References Cited

U.S. PATENT DOCUMENTS 9,479,382 B1 * 10/2016 Ward, Jr. ............... G06F 9/5027
2004/0122926 A1 * 6/2004 Moore .................. G06F 16/951
709/223

(Continued)

FOREIGN PATENT DOCUMENTS

WO WO-2017190795 A1 11/2017
WO WO-2019199405 A1 10/2019

OTHER PUBLICATIONS

Matthew Hooper, "Top Five Blockchain Benefits Transforming Your Industry," Feb. 22, 2018. (Year: 2018).*

(Continued)

*Primary Examiner* — Andrew C Georgandellis
(74) *Attorney, Agent, or Firm* — Schwegman Lundberg & Woessner, P.A.

(57) ABSTRACT

An architecture to enable verification, ranking, and identification of respective edge service properties and associated service level agreement (SLA) properties, such as in an edge cloud or other edge computing environment, is disclosed. In an example, management and use of service information for an edge service includes: providing SLA information for an edge service to an operational device, for accessing an edge service hosted in an edge computing environment, with the SLA information providing reputation information for computing functions of the edge service according to an identified SLA; receiving a service request for use of the computing functions of the edge service, under the identified SLA; requesting, from the edge service, performance of the computing functions of the edge service according to the service request; and tracking the performance of the computing functions of the edge service according to the service request and compliance with the identified SLA.

24 Claims, 20 Drawing Sheets

(51) Int. Cl.
*H04L 41/5019* (2022.01)
*H04L 67/51* (2022.01)
*H04L 67/12* (2022.01)

(56) References Cited

U.S. PATENT DOCUMENTS

| | | |
|---|---|---|
| 2005/0234937 A1* | 10/2005 | Ernest .................. G06F 11/3495 |
| 2008/0137550 A1 | 6/2008 | Jurca et al. |
| 2009/0279444 A1 | 11/2009 | Ravindran et al. |
| 2011/0119225 A1 | 5/2011 | Ghosh et al. |
| 2012/0095908 A1* | 4/2012 | Barrie ..................... G06Q 30/02 705/39 |
| 2013/0103779 A1* | 4/2013 | Bai ........................ H04H 20/62 709/213 |
| 2013/0304900 A1* | 11/2013 | Trabelsi .............. H04L 67/1057 709/224 |
| 2015/0058477 A1 | 2/2015 | Gould et al. |
| 2016/0063425 A1 | 3/2016 | Fettig et al. |
| 2016/0094472 A1 | 3/2016 | Tischer et al. |
| 2016/0337175 A1 | 11/2016 | Rao |
| 2018/0115468 A1* | 4/2018 | Bildhauer ............. G06F 9/5055 |

OTHER PUBLICATIONS

Gabriel Brown, "Mobile Edge Computing Use Cases & Deployment Options," Jul. 2016. (Year: 2016).*

"International Application Serial No. PCT US2019 021875, International Search Report dated Jun. 12, 2019", 3 pgs.

"International Application Serial No. PCT US2019 021875, Written Opinion dated Jun. 12, 2019", 6 pgs.

"International Application Serial No. PCT/US2019/021875, International Preliminary Report on Patentability dated Oct. 22, 2020", 8 pgs.

"European Application Serial No. 19784520.9, Extended European Search Report dated Jan. 13, 2022", 11 pgs.

Jurca, Radu, et al., "Reputation-Based Service Level Agreements for Heb Services", Advances in Databases and Information Systems; [Lecture Notes in Computer Science; Lect.Notes Computer], Springer International Publishing, Cham, (Dec. 12, 2005), 396-409.

"European Application Serial No. 19784520.9, Response filed May 12, 2022 to Extended European Search Report dated Jan. 13, 2022", 17 pgs.

"Korean Application Serial No. 10-2020-7026303, Voluntary Amendment filed Apr. 5, 2022", w/ English claims, 8 pgs.

* cited by examiner

EDGE COMPUTING SERVICE GLOBAL VALIDATION

PRIORITY CLAIM

This application claims the benefit of priority to U.S. Application Ser. No. 62/656,682, filed Apr. 12, 2018, which is incorporated herein by reference in its entirety.

TECHNICAL FIELD

Embodiments described herein generally relate to edge computing and related distributed computing environments, and in particular, to security, verification, and management techniques usable with services operable at edge computing platforms.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service which offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at "edge" of the network.

Edge computing may be further integrated with use cases and technology developed for the Internet of Things (IoT) and Fog networking, as endpoint devices and gateways attempt to access network resources and applications at locations moved closer to the "edge" of the network. For instance, developing edge computing use cases in mobile network settings have been designed for integration with multi-access edge computing (MEC), also known as "mobile edge computing". MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations with orchestration, coordination, and resource management, especially in complex mobility settings where many participants (devices, hosts, service providers, operators) are involved. As a result, many proposed architectures have not achieved the full benefits that edge computing is intended to offer.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
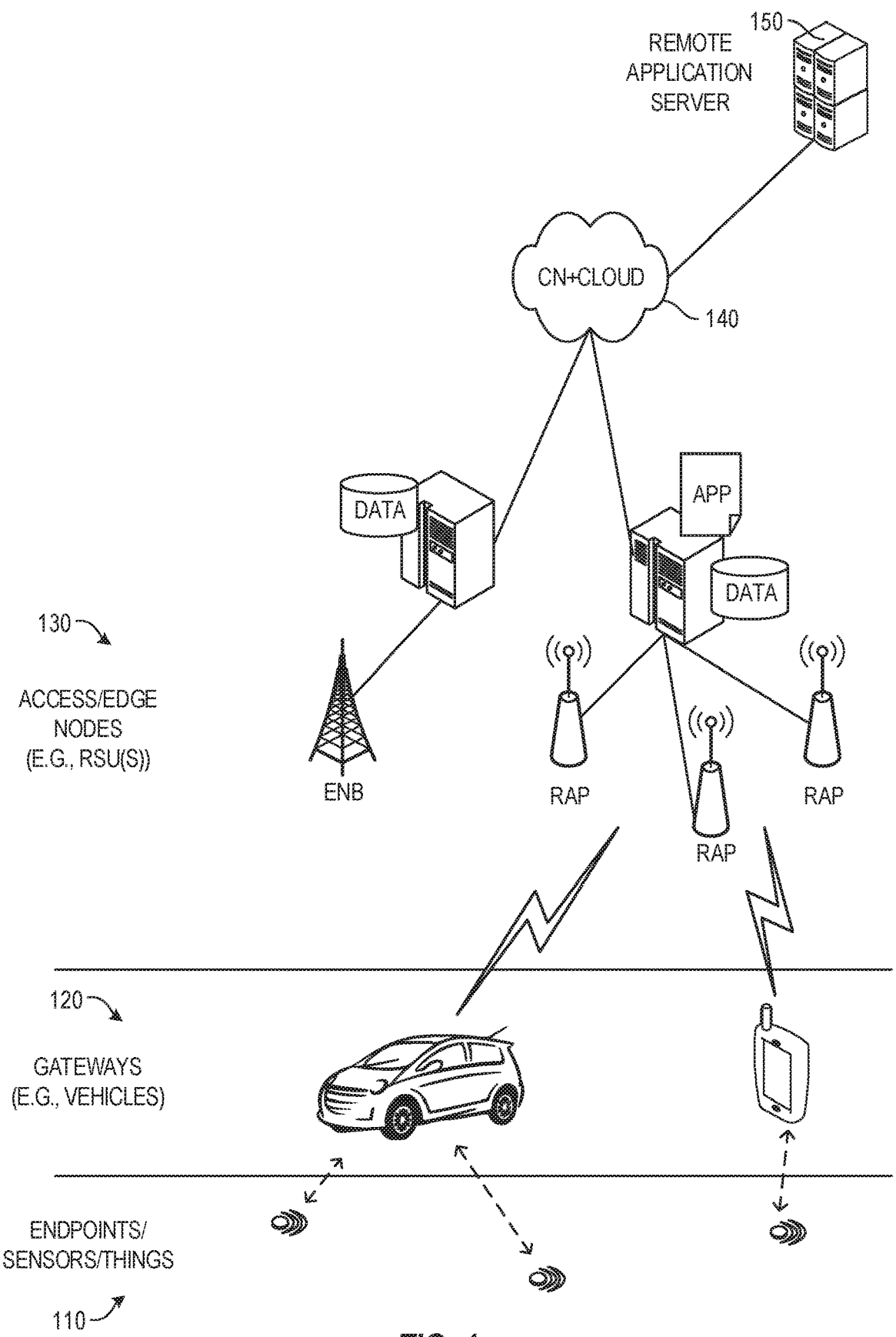
FIG. 1 illustrates devices and network entities in a dynamic communications environment, according to an example.

In the following description, methods, configurations, and related apparatuses are disclosed for a rating and validation system, which enables the verification and analysis of specific services and service operations in edge computing deployments. In edge computing scenarios, such as in an MEC ecosystem, multiple entities may be actively involved to provide a partial functional component in an overall solution (e.g., an individual service consumed by a user application, in an overall system of many available services). When multiple entities are involved, the end user (customer) is often isolated from knowing the identify and diversity of ecosystem players that may collaborate to provide the overall solution. However, various stakeholders in the ecosystem wish to hold their co-suppliers and collaborators accountable for the particular edge services and functions that they provide to meet a particular level of service or objective.

The present techniques and configurations enable customers and other ecosystem entities to establish, identify, and verify edge service reputations. A reputation value or rating may be included as a service level agreement (SLA) criteria when making a selection of a particular edge service provider or system. The present techniques and configurations also allow service telemetry data to contribute to the reputation value or rating as a way of indicating a historical track record of service and service attributes (reliability, availability, security, safety, and the like).

In an example, services that are newly included in the edge (e.g., added, updated, discovered, etc.) are validated by a set of validator nodes (e.g., services or systems managed by operators, administrators, etc.). These validator nodes are responsible to validate that a new service exposed by a given edge location or a given provider is valid. Once a service is available to be deployed, the provider of the service sends out a request for deployment to the validators, so that the service can be added to a list of validated services. The results of validation are independent of whether such service is consumed or rated by a human, robot, etc.

In further examples, the validation information for an edge service may be logged and persisted. For instance, a blockchain or other data store may be used to keep track of edge service and service provider reputation details. These reputation details may be simplified or reduced to a more consumable format (e.g., as a n-star rating, that is associated with the service and may be used for discovery), and such reputation details may be utilized as part of SLA creation and for making recommendations to other edge computing entities and service providers. Indeed, the present techniques and configurations support an entity which provides edge computing services to obtain a separate reputation measurement (such as a reputation that is a summary or aggregation of the scores of the edge services). In this manner, a decision can be made based on the specific service and the entity providing services.

The present techniques support a variety of edge computing installations, by enabling validated services to be offered to and investigated by application endpoints, which offers an improvement in security and operability. The present techniques may also extend the ability of an edge environment and individual entities to improve performance of computing and network resources, and achieve reliable edge services with low latency or at a high bandwidth.

The following systems and techniques may be implemented in, or augment, a variety of distributed, virtualized, or managed networking environments. These include environments in which network services are implemented within using MEC platforms, network function virtualization (NFV), or fully virtualized 4G/5G network configurations. Thus, various references are made to defined types of telecommunications equipment and architectures. Additionally, in the present disclosure, reference is made to Long Term Evolution (LTE), 5G, eNBs, gNBs, and similar radio access network concepts, but it is intended that the present techniques may be utilized with variations or substitution of the type of network deployed. (For example, all described solutions referencing LTE may also be applicable in new radio (NR)/5G or like next generation systems).

FIG. 1 illustrates devices and network entities in a dynamic, multi-access communications environment. FIG. 1 specifically illustrates the different layers of communication occurring within the environment, starting from endpoint sensors or things 110 (e.g., operating in an IoT network topology); increasing in sophistication to gateways (e.g., vehicles) or intermediate nodes 120, which facilitate the collection and processing of data from endpoints 110; increasing in processing and connectivity sophistication to access or edge nodes 130 (e.g., road-side units operating as edge computing nodes), such as may be embodied by base stations (eNBs), roadside access points (RAPs) or roadside units (RSUs), nodes, or servers; and increasing in connectivity and processing sophistication to a core network or cloud setting 140. Indeed, the processing at the core network or cloud setting 140 may be enhanced by network services as performed by a remote application server 150 or other cloud services.

As shown, in the scenario of FIG. 1, the endpoints 110 communicate various types of information to the gateways or intermediate nodes 120; however, due to the mobility of the gateways or intermediate nodes 120 (such as in a vehicle or mobile computing device) this results in multiple access points or types of access points being used for network access, multiple distinct services and servers being used for computing operations, multiple distinct applications and data being available for processing, and multiple distinct network operations being offered as the characteristics and capabilities of the available network services and network pathways change. In particular, the environment may involve aspects of Vehicle-to-Infrastructure (V2X), Vehicle-to-Vehicle (V2V) and Vehicle-to-Infrastructure (V2I) services from vehicle user equipment (UE) or human-operated portable UEs (e.g., mobile smartphones and computing devices), which introduces significant complexity for computing services and network usage.

Figure 2:
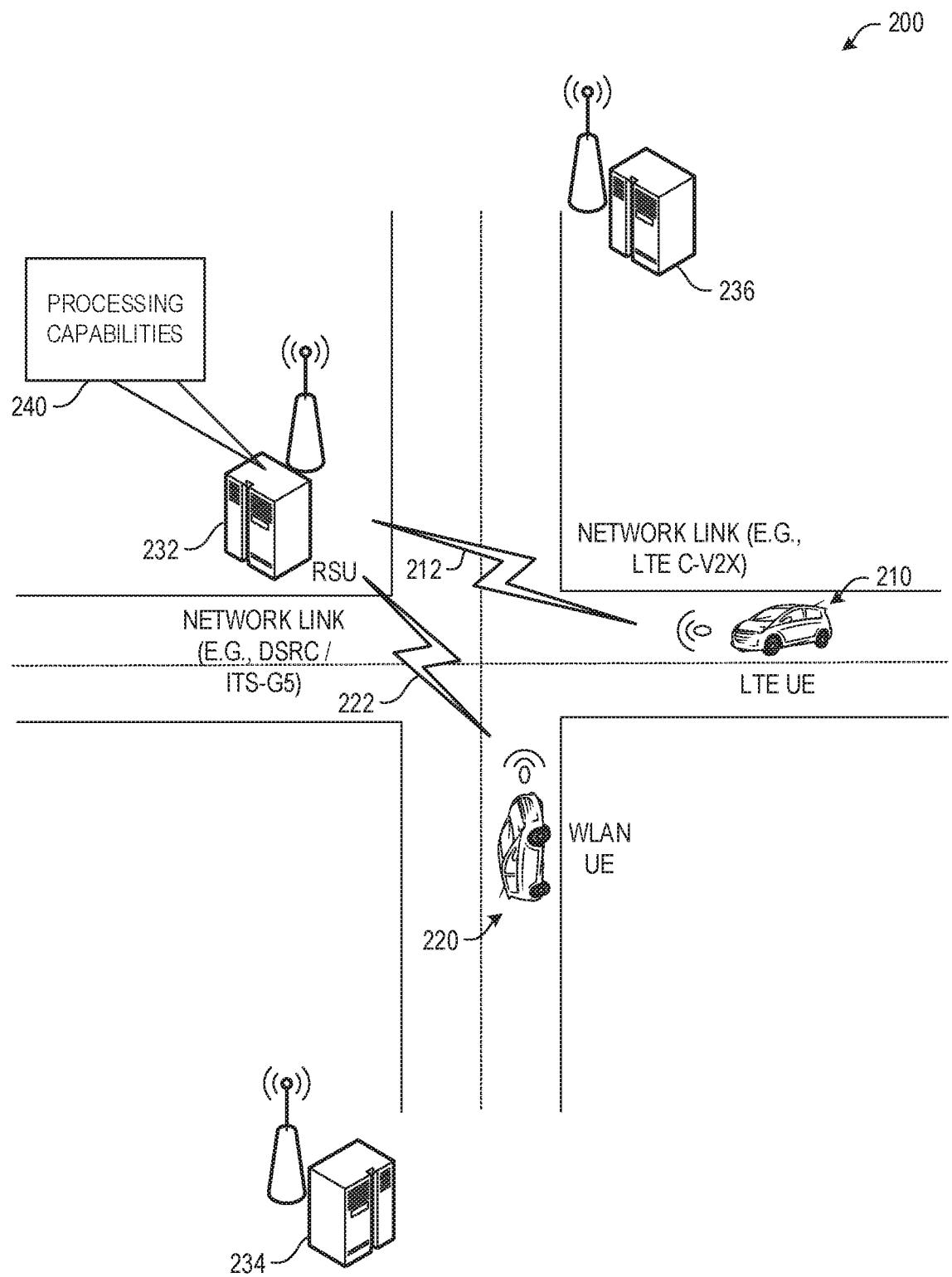
FIG. 2 illustrates an operative arrangement of network and mobile user equipment, according to an example.

FIG. 2 illustrates an operative arrangement 200 of network and vehicle user equipment, in which various embodiments may be practiced. In arrangement 200, vehicle user equipment (vUE) 210, 220 may operate with a defined communication system (e.g., using a LTE C-V2X WWAN 212, or a SRC/ETSI ITS-G5 (WLAN) communication network 222, etc.). In embodiments, a Road Side Unit (RSU) 232 may provide processing services 240 by which the vUEs 210 and 220 may communicate with one another (or to other services), execute services individually and with each other, or access similar aspects of coordinated or device-specific edge computing services. In embodiments, the processing services 240 may be provided by a MEC host (e.g., an ETSI MEC host), MEC platform, or other MEC entity implemented in or by hardware of the RSU 232. In this example, the RSU 232 may be a stationary RSU, such as an eNB-type RSU or other like infrastructure. In other embodiments, the RSU 232 may be a mobile RSU or a UE-type RSU, which may be implemented by a vehicle (e.g., a truck), pedestrian, or some other device with such capabilities. In these cases, mobility issues can be managed in order to ensure a proper radio coverage of the applicable services. For instance, mobility may be managed as the respective vUEs 220, 210 transition from, and to, operation at other RSUs, such as RSUs 234, 236, and other network nodes not shown.

The following describes aspects of a service validation and rating system, for use of edge computing services, such as in the environments depicted in FIGS. 1 and 2. The service validation and rating system is associated with each edge computing service and may be used and maintained by a variety of data sources, from end customers (including consumer users, consumer devices, etc.) to edge operational environment entities such as an orchestrator, edge service provider, edge hosting service, or the like. As discussed further below, relevant information for the system may be persisted for verification through use of a reputation service or blockchain service. For instance, a blockchain distributed ledger may provide a safe and auditable location to store ratings information and resulting service information.

Accordingly, using with the edge service validation techniques discussed herein, the RSUs depicted in FIGS. 1 and 2 may host orchestration functions that maintain reputation scores. Vehicles or other UEs may select from a set of available RSUs based on reputation exclusively, or weighted with other criteria such as proximity, types of services offered, or the like.

In further examples, a ratings aggregator service may be involved in computing a rating (e.g., a numerical value, or a "star"-based rating) of a particular edge service from the various inputs. The rating may be included in an SLA for a new customer (e.g., user, consumer device, etc.) where the customer specifies a minimum acceptable rating for some aspect of the service in the SLA contract. An orchestrator may provide evidence/proof of an accurate rating before the SLA is finalized. Data obtained from the reputation service or blockchain may be utilized to accomplish this evidence.

Figure 3:
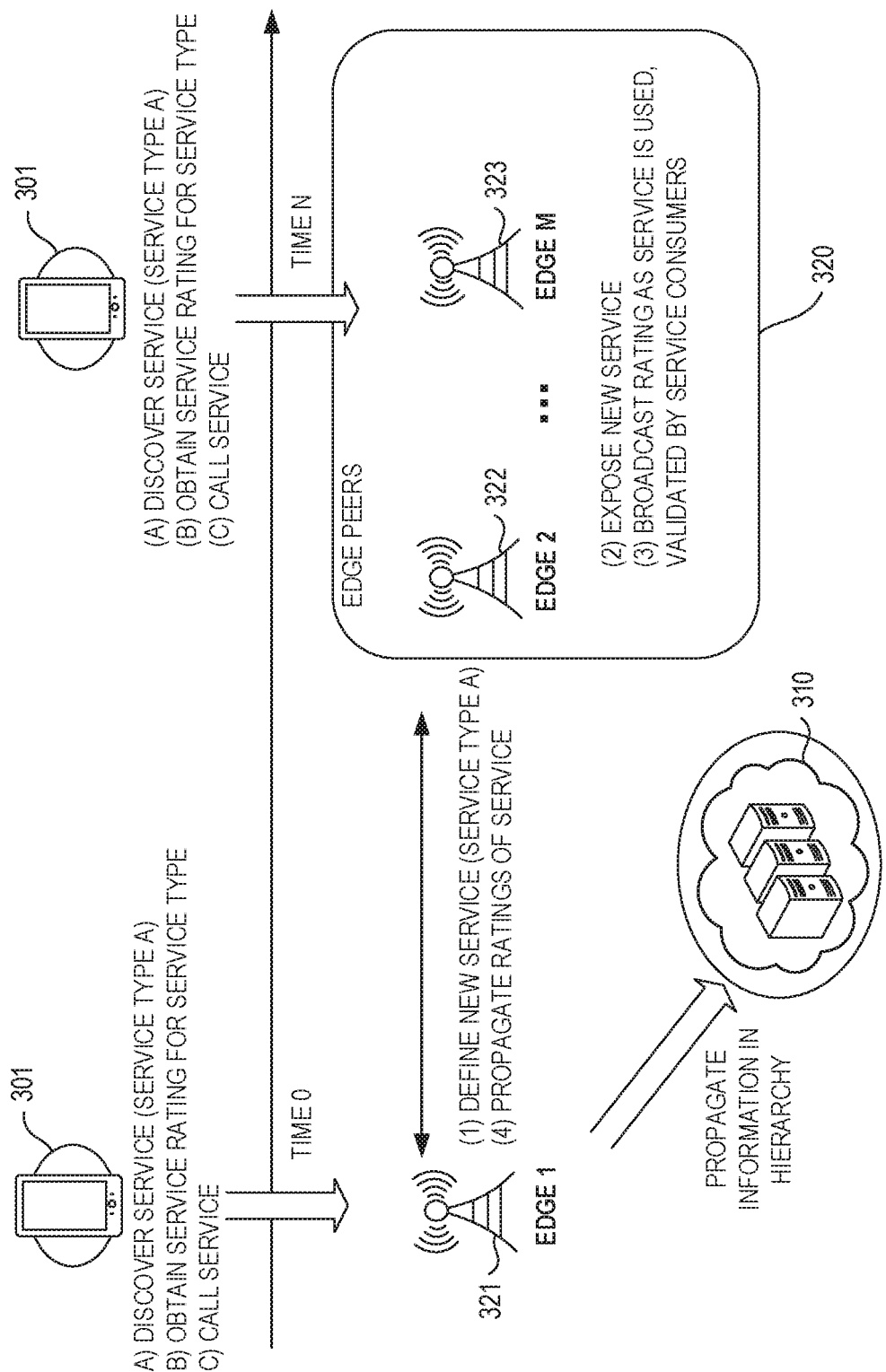
FIG. 3 illustrates a scenario for verification of an edge computing service, according to an example.

FIG. 3 illustrates an example scenario 300 of edge service validation. As shown, an endpoint device 301 operates in a mobile environment to move from a first location (e.g., in the coverage area of Edge 1 service 321) at time 0 to a second location (e.g., in the coverage area of Edge 2 service 322 and Edge M service 323) at time N. However, in many scenarios, two or more edge services are available at a given location for utilization by an endpoint device, including in scenarios where the endpoint device is indirectly connected to other edge nodes via another edge node, radio access node, bridge, gateway, etc.

In an example, the device 301 utilizes a service verification technique when commencing operation with a new service, such as to perform a computing function in an edge computing environment. This service verification technique may occur at time 0 or when changing to/beginning operation of another service at time N. As depicted in FIG. 3, the service verification techniques may begin (operation (A)) as the device 301 discovers the service of a particular service type (service type "A") from available edge computing resources. Based on this discovery, an orchestrator or other manager of an edge resource (e.g., Edge Node 1 at time 0, Edge Node M at time N) returns an identifier of an applicable edge service (e.g., service=A1), with a current reputation or quality rating for the service (e.g., 0.8 out of a maximum 1.0 rating) (operation (B)). The device 301 then makes a call to the service of the edge node, to utilize the service according to an SLA requirement which meets a defined reputation or service quality rating (operation (C)).

The utilization of the service may result in the device 301 providing an updated rating or rating change based on whether the SLA or another condition or criteria was met. Accordingly, with these techniques, services of a first type (e.g., service type A) may be effectively replicated and utilized across multiple edge peers. Thus, in the scenario of FIG. 3, the device 301 at different times may include the same UE or may) include a second UE where a propagated rating of a service is used by the second UE to select the relevant service (and to discover and utilize a service available from another provider of the first service type, e.g., service type A).

The operations at the edge nodes (e.g., Edge Node 1 321) to facilitate the service verification technique may begin at the definition of a new service of the service type (e.g., service type A) (operation (1)). In an example, this service definition may include the specification of a service identifier, service type, metadata, output or input type, and like parameters. The operations at the edge nodes then continue with the communication of service information to other edge node peers, to expose the new service (operation (2)). Rating information for the new service is also communicated to other edge peers, with the rating being updated as a service is used, and as the rating is validated or updated by service consumers (operation (3)). For example, a certified rating may be broadcasted to a service provider and all peers as the service is used and validated by consumer users. The accuracy, validity, and completeness of the rating improves over time as a result of validating performance, SLA results, inputs and outputs, and the like. Finally, as a result of establishing the rating, rating information can be discovered by devices and used to establish trusted relationships among linked devices and resources 310 as the subject services are more widely executed. As will be understood, such rating information may be propagated within many users of a hierarchy (e.g., among associated entities of a defined service level agreement, a respective edge service provider, an edge service, etc.). Further techniques for identifying, computing, and communicating rating information are provided in FIGS. 4 to 7.

Figure 4:
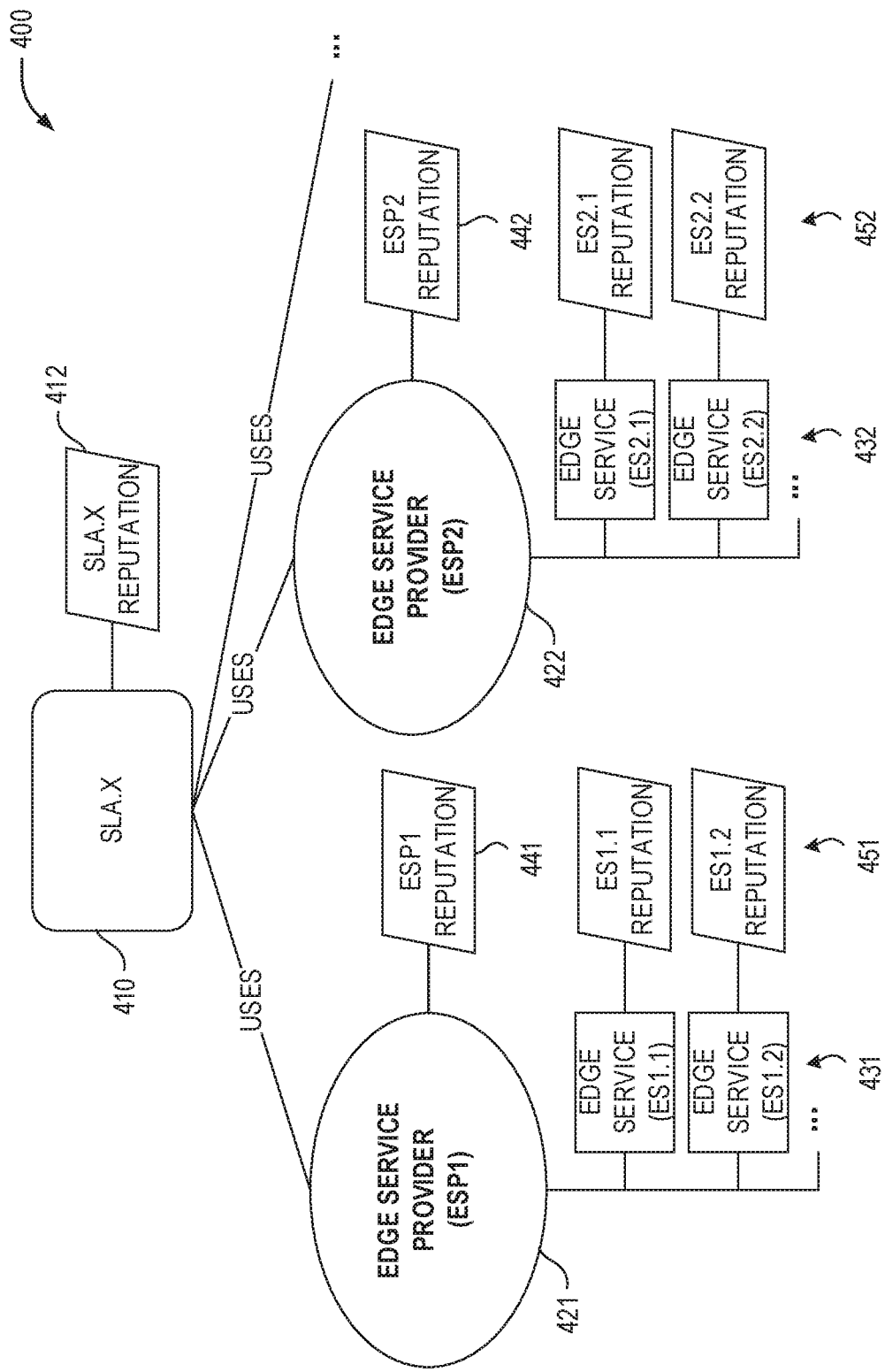
FIG. 4 illustrates a data relationship diagram used with service level agreements, edge service providers, and edge services, according to an example.

FIG. 4 illustrates a data relationship diagram 400 providing an example of how various edge computing entities with reputations are related to one another. As shown, a particular service level agreement instance 410 has a data relationship as a consumer (user) of various edge service providers. Specifically, the SLA is considered as a user of services provided via edge service provider 1 (ESP1) 421, edge service provider 2 (ESP2) 422, and the like. Each edge service provider 421, 422 has a respective set of one or more associated edge services 431, 432 (ES1.1, ES1.2 for ESP1 421, and ES2.1, ES2.2 for ESP2 422) to fulfill various service operations.

Additionally, the SLA instance 410 has associated reputation data 412, the respective ESPs have associated reputation data 441, 442, and the respective edge services have associated reputation data 451, 452. This reputation data may be analyzed and verified as a consumer determines the use of a particular SLA, a service provider associated with the SLA, and an edge service associated with the SLA. The respective processes of: requesting and verifying an SLA for a service are detailed in FIG. 5; requesting and verifying reputation information for an edge service and edge service provider are detailed in FIG. 6; and requesting and verifying a reputation score via a reputation service are detailed in FIG. 7.

Figure 5:
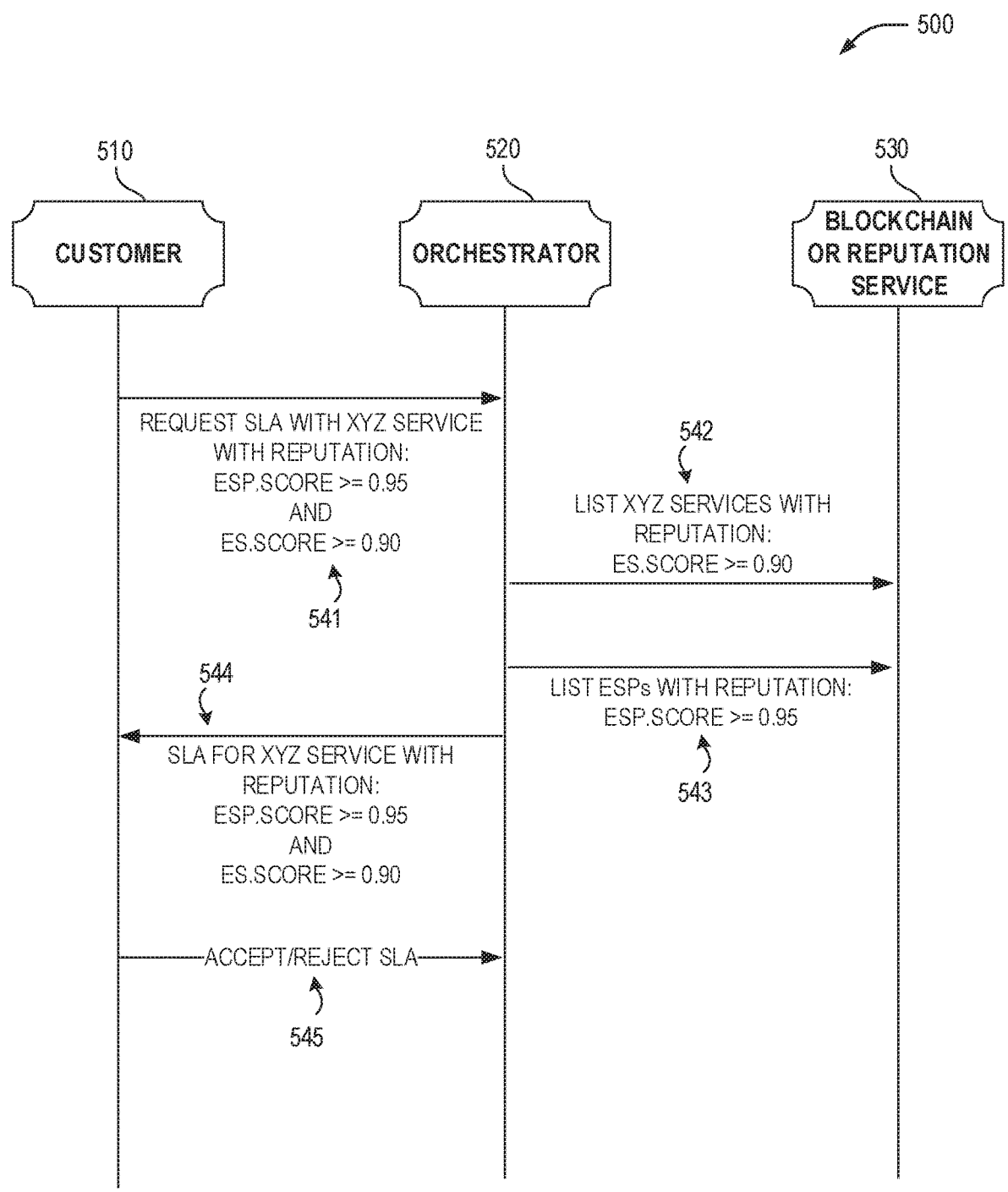
FIG. 5 illustrates a sequence diagram of operations for requesting and verifying a service level agreement, according to an example.

FIG. 5 provides a sequence diagram 500 of operations for requesting and verifying an SLA among a customer 510, an orchestrator 520, and a blockchain or reputation service 530. As shown, a first operation 541 is performed by the customer 510 (e.g., an endpoint consumer or customer device, such as a UE), which requests an SLA from an orchestrator 520 for use with a particular service having a particular reputation attribute. Further, the customer 510 may indicate in this request that a reputation score for an available edge service provider may need to satisfy some minimum value (e.g., at or greater than 0.95) and reputation score for a particular edge service may need to satisfy some minimum value (e.g., at or greater than 0.90). The scenario depicted in diagram 500 depicts the use of numerical value scale between 0 and 1.0 to measure reputation; however, other types of rating values or rating scales may be used. Further, a representation of a score may be mapped to a numerical score such as a graphic depicting "stars", "likes", or other representations capturing a scaled or measured value (e.g., a M of N ratio).

The sequence diagram 500 continues with the orchestrator 520 using the requested service criteria to identify applicable service providers and applicable services from a reputation tracking entity. This is shown with an operation 542 to obtain a list of services of a particular service type matching the reputation score (e.g., services having a score at or greater than 0.90) or satisfying other reputation criteria. This is also shown with an operation 543 to obtain a list of service providers matching the reputation score (e.g., services having a reputation at or greater than 0.95) or satisfying other reputation criteria. In an example, this service and service provider information is obtained by the orchestrator 520 from a blockchain (e.g., distributed digital ledger) or a reputation service 530 which maintains or compiles a verifiable list of scores for the services and service providers. In still further examples, the reputation service itself may utilize a blockchain, although other mechanisms for data storage and verification may be used.

Based on the reputation data collected by the orchestrator 520 relevant to the requested service(s), the orchestrator 520 may configure, select, or adapt an SLA for the requested service(s), and communicate information regarding this SLA to the customer 510 in operation 544. This SLA may indicate service attributes which match (or provide a best match) of a particular computing function or set of functions provided by an edge service, edge service provider, or other entities. The customer 510 may indicate an acceptance or rejection of the SLA to the orchestrator 520 in operation 545. In further examples, error handling, including the identification of alternative SLAs or services, may be performed in response to a customer rejection of the SLA.

Figure 6:
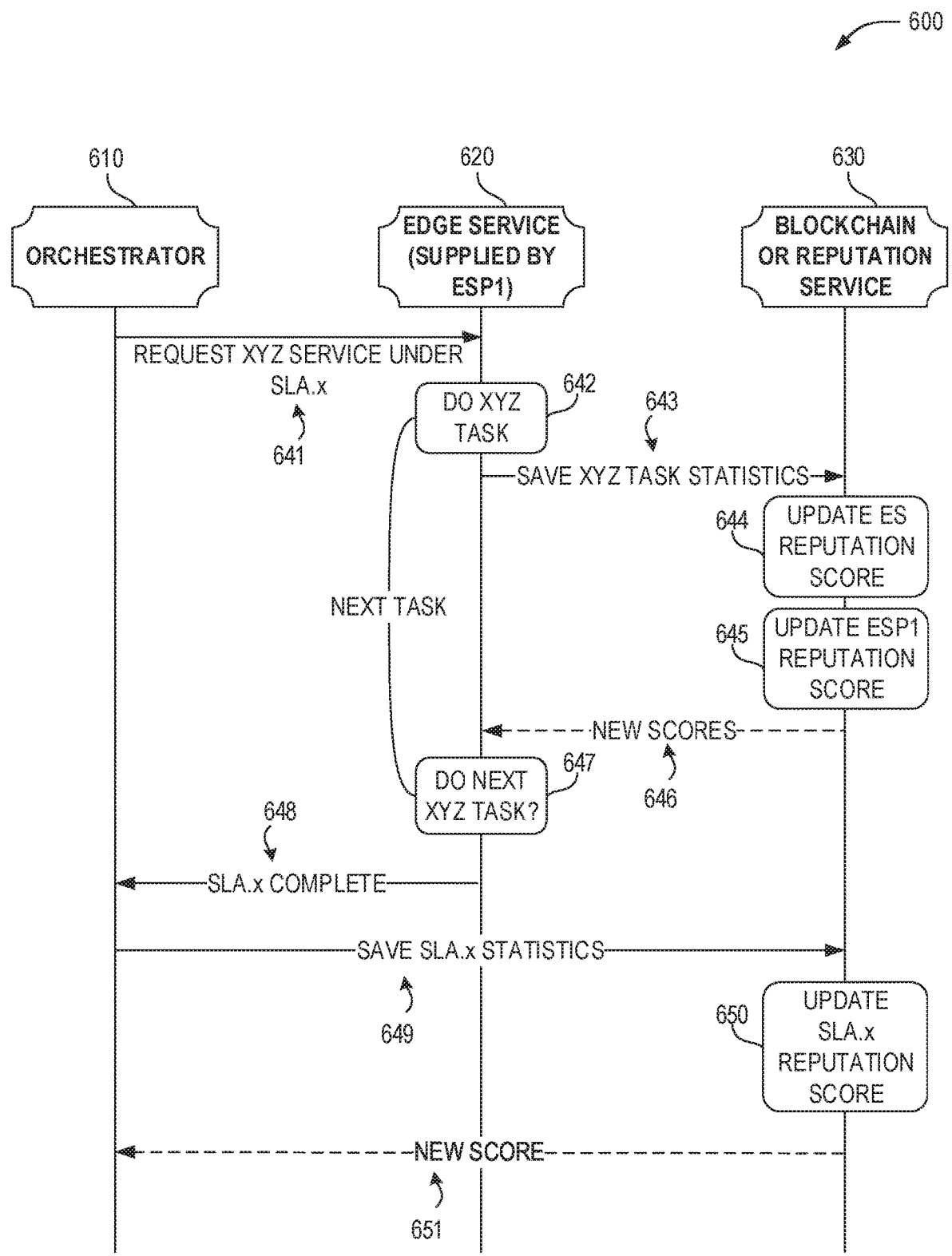
FIG. 6 illustrates a sequence diagram of operations for updating scoring for a service level agreement and a related edge service and service provider, according to an example.

FIG. 6 illustrates a sequence diagram 600 of operations for updating scoring for an SLA and a related edge service and service provider, among an orchestrator 610, edge service 620, and a blockchain or reputation service 630. Specifically, the operations for updating scoring may be used to manage and track the results of a service operation on a task-by-task basis performed by the service, such as to increase a reputation score for the edge service 620 or an associated service provider when the edge service 620 successfully performs the task (and, to decrease a reputation score for the edge service 620 or an associated service provider when the task is not performed, performs the task late or not according to a specified condition, etc.).

The sequence diagram shows an orchestrator 610 providing a request to an edge service 620, at operation 641, to conduct a particular computing function (task) under a particular SLA (and SLA conditions). The edge service 620 then commences to perform the requested task, at operation 642, for the particular service, and save task statistics, at operation 643, regarding the performance of the tasks to the blockchain or reputation service 630.

The task statistics or other information that is communicated to the blockchain or reputation service 630 may be associated with the execution of the edge service and an associated edge service provider. For instance, the blockchain or reputation service 630 may update an edge service reputation score for the particular edge service (at operation 644) and update an edge service provider reputation score for the service provider associated with the particular edge service (at operation 645). The updating of the reputation score(s) may result, in some scenarios, in new scores or other reputation information being communicated back to the edge service 620 in operation 646. (Updating new scores may also be conveyed to other network entities, including back to the orchestrator 610, consumer devices, or other entities to enable service adaptation or changes.) The edge service 620 then commences with further operations 647 to perform additional tasks as part of the service or service type, as applicable.

The edge service 620 may communicate an indication to the orchestrator 610, in operation 648, when the services associated with the SLA are complete. This information may include score information (from operation 646) discussed above, or other aspects relevant to an SLA. The orchestrator 610 then may provide updated rating information relevant to the SLA as a whole. For instance, the orchestrator 610 may collect and communicate statistics on the usage of the SLA, such as communicating the usage statistics to the blockchain or reputation service 630 in operation 649. In turn, the blockchain or reputation service 630 may update a reputation score for the SLA at operation 650 based on usage or monitoring by the orchestrator, customer, or other entities. An updated score for the SLA (or, the edge service, or service provider, etc.) then may be communicated to the orchestrator 610 in operation 651.

Figure 7:
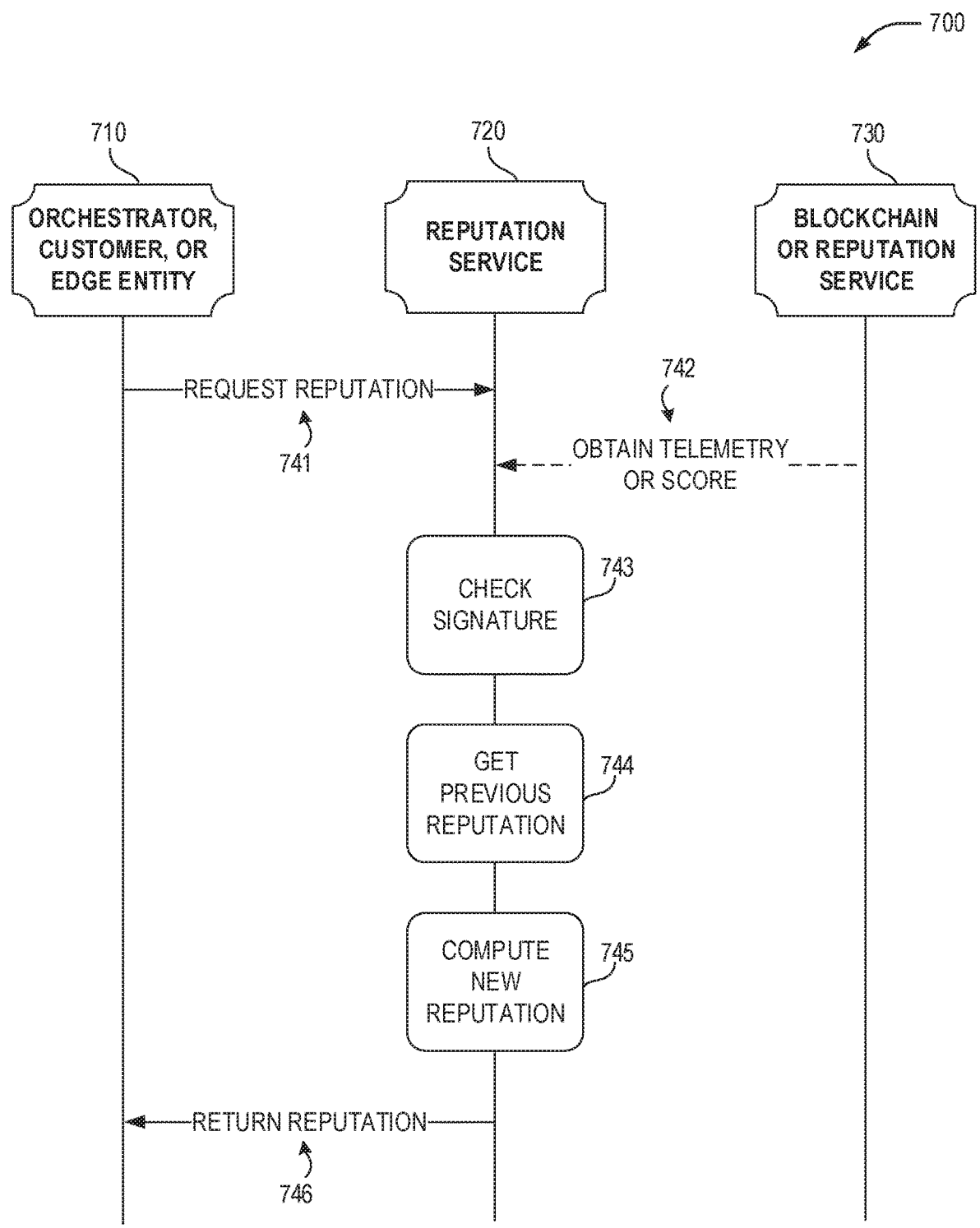
FIG. 7 illustrates a sequence diagram of operations for obtaining a reputation score in an edge service context, according to an example.

FIG. 7 illustrates a sequence diagram 700 of operations for obtaining a reputation score in an edge service context, among a requesting entity (e.g., orchestrator, customer, or edge entity) 710, reputation service 720, and a blockchain or a secondary reputation service 730. For example, the operations may be performed in the context of verifying or checking reputation status of an edge service, edge service provider, SLA, etc.: updating reputation information (including during the operations depicted in FIGS. 5 and 6); and the like.

The operations of diagram 700 commence with a request at operation 741 from the requesting entity to obtain reputation information associated with an edge service (or other edge computing entity) from the reputation service 720. Based on this request, the reputation service 720 may obtain telemetry information associated with use of the edge service/service provider/SLA, or a reputation score (including individual scores or an aggregate of scores), to collect relevant data points usable in determining the reputation information.

The reputation service 720 performs further operations to determine a relevant reputation score, metric, or other value of the reputation information. This may include checking a signature at operation 743, obtaining previous reputation information at operation 744, and computing new reputation information at operation 745. This reputation information then may be returned to the requesting entity 746, and communicated to other relevant entities for use in the network or device deployment.

Figure 8:
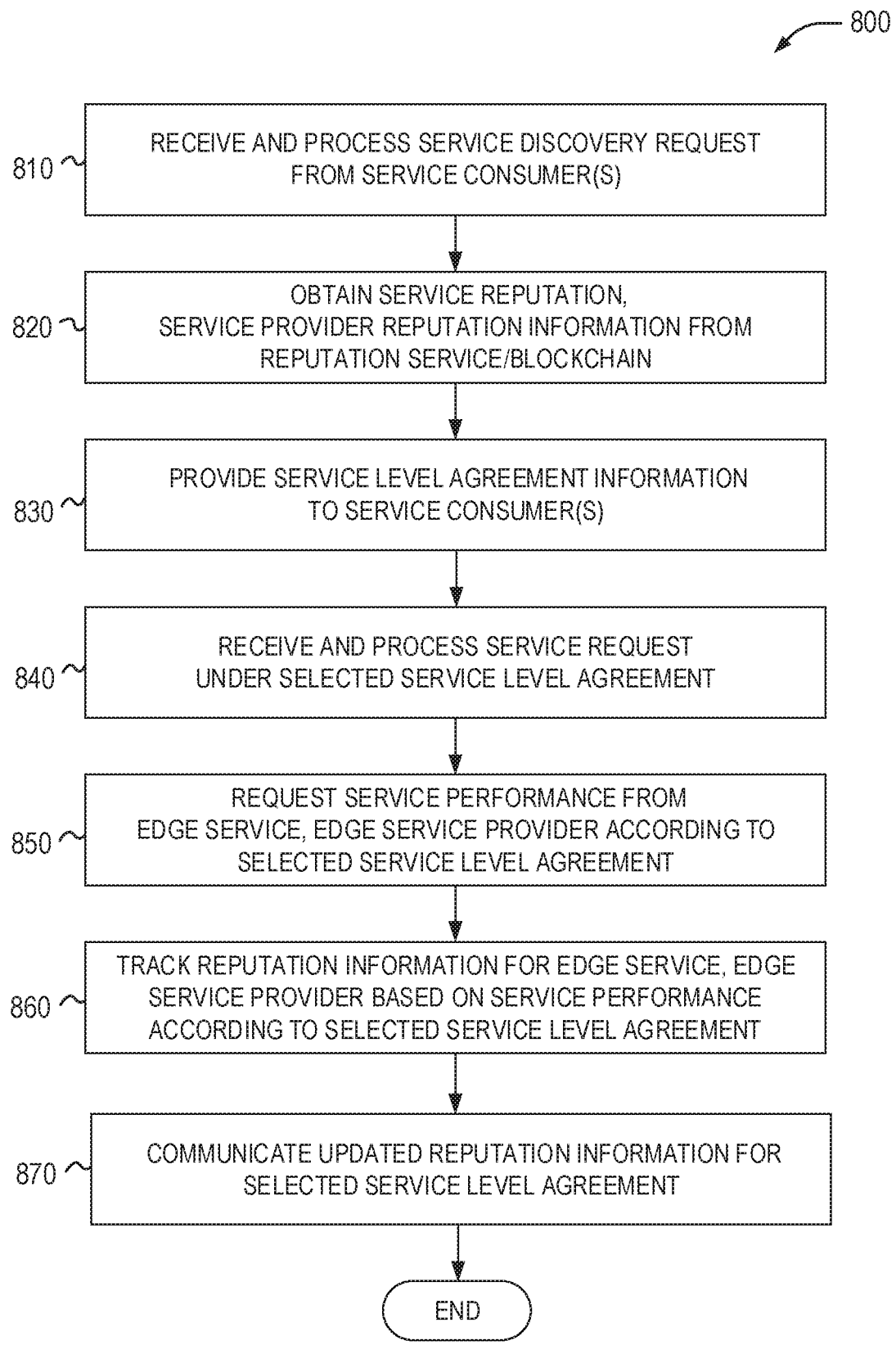
FIG. 8 illustrates a flowchart of a method for establishing and verifying validation information for an edge service, according to an example.

FIG. 8 illustrates a flowchart 800 of an example method of establishing and verifying validation information for a computing service operating in an edge computing environment. It will be understood that the following operations are depicted from the perspective of an orchestrator, such as an orchestrator embodied in MEC system; however, corresponding operations may be performed or coordinated by endpoint communication devices, services, intermediate devices, or other entities and services in an implementing system.

The flowchart 800 commences at 810 with the receipt and processing of a service discovery request at a processing system (e.g., orchestrator) from one or more service consumers (e.g., an operational endpoint device). This request may be provided as part of a request for SLA information, a request for a recommended SLA, or a request for network service information. In an example, this request may include a specification of a reputation score (e.g., minimum score) for operation of a respective edge service, and the specification of a reputation score for operation of the service by a respective edge service provider. Based on this request, the processing system may obtain reputation information, at 820, to enable a compilation of the SLA information and an SLA which meets the reputation score specifications. In an example, reputation data collected by the processing system to compile this information may include a listing of at least one edge service that matches the reputation score for the respective edge service, for edge services operated by a service provider which also matches the reputation score for the respective edge service provider. This information may be collected from a reputation service, blockchain, etc.

The relevant SLA information is then communicated to the operational device, which may provide reputation information for the edge service and edge service provider according to the identified SLA. Thus, as a result of operations 810-830. SLA information is identified and provided to an operational (consumer) device, to enable the operational device to conduct computing functions of the edge service that match characteristics of an identified SLA.

The flowchart 800 continues with an operation at 840 to receive and process a service request, provided under the identified SLA that is selected for use by the operational device. Based on this service request, a service performance is requested at 850 using a particular edge service and edge service provider, according to the terms of the identified SLA. As discussed in the examples herein, the edge service is operated by an edge service provider, and computing functions of the edge service are associated with a defined edge service type. These computing functions may be further coordinated by an orchestrator or other entities in the network.

Based on the performance of the computing functions, reputation information may be tracked at 860 for the edge service, edge service provider, and SLA. In some examples, reputation information may be identified and updated on a task-by-task basis as respective tasks are performed with the computing functions successfully or unsuccessfully (e.g., according to some defined conditions or criteria associated with the task). Finally, any updated reputation information may be tracked or communicated, at 870, for management and handling by a reputation service, blockchain, operational device, orchestrator, or other entities.

Further operations for the integration of blockchain or data auditing operations may also occur in connection with operations 810-870. It will be understood that other types of scoring, data management, telemetry, and service level processing operations may provide further adaptation to the method of flowchart 800 as discussed herein.

In further examples, the present techniques for edge system reputation verification and validation may be implemented with the following types of a blockchain architecture. The following examples provide an overview of a generic blockchain system implementation (FIG. 9) as well as a specific blockchain system implementation (FIGS. 10-13) used for the recordation and validation of device management and device compliance information. Specifically, the following examples discuss how compliance data could be recorded to the blockchain, allowing any node which is capable of validating node claims to assert the results of their validation. It will be understood that the device management and compliance information referenced in the following examples may be substituted with aspects of the reputation and edge service information discussed in FIGS. 3 to 8, to enable recordation and auditing of reputation information, ratings, and the like.

Figure 9:
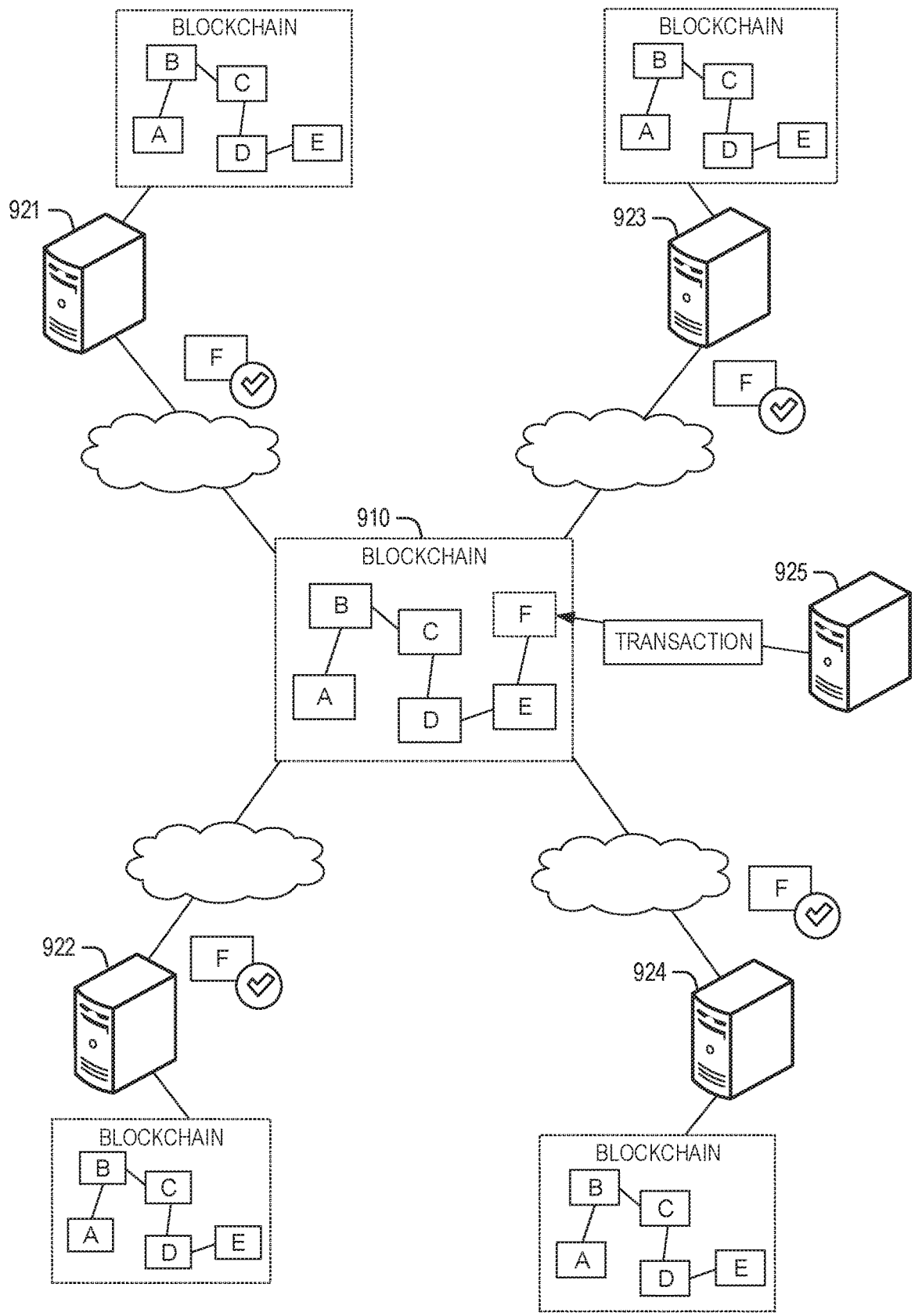
FIG. 9 illustrates a blockchain system implementation, according to an example.

FIG. 9 illustrates a blockchain system implementation, according to an example. As is understood, a blockchain is a distributed database (e.g., distributed ledger) that maintains a growing list of data records that are hardened against tampering and revision. A blockchain (e.g., chain 910) includes "blocks," which hold data or both data and programs. Each block holds batches of individual "transactions" between blockchain participants. Each block includes a timestamp and linking information (usually a hash value) linking the current block to the previous block: the linking information allows traversal of the blockchain (in either direction).

Blockchain transactions are integrity protected using a distributed hashing algorithm that requires each transaction processor (e.g., "miner", as shown with miners 921, 922, 923, 924) to agree to the next block in the blockchain (e.g., provided as a result of transaction by participant 925). Integrity is achieved through a consensus of multiple miners 921, 922, 923, or 924, each miner 921, 922, 923, or 924 having access to its own copy of the blockchain 910, which is also referred to as a distributed ledger. If a majority of the miners 921, 922, 923, or 924 agree on the contents of the ledger, then those agreed upon contents become the "truth" for the ledger: the miners 921, 922, 923, or 924 that disagree will accept the truth of the majority (otherwise, they would not be able to function). Integrity is provable because an attacker would have to compromise a majority of miners and modify their copies of the ledger; this is extremely difficult (if not impossible).

In the remaining paragraphs, methods, configurations, and related apparatuses are disclosed for establishing and using a blockchain, specifically a blockchain for ensuring or verifying compliance in network operation settings. In particular, the following discussion provides reference to a conformance test for validation of a specific device, device status, or device security state. It will be understood that variation to the following techniques may be applied for validation of a particular service, such as with the integration of the techniques discussed in FIGS. 3 to 8 above in the following blockchain implementation.

Previously, compliance to a conformance test, security evaluation criteria, and quality assurance criteria have been acknowledged by printing a paper document or PDF of a paper document signifying compliance. A product may fall out of compliance when subsequent revisions are brought to testing labs. Compliance with previous revisions may not be re-verified when a new revision/brand is vetted. In compliance tests involving security evaluations, changes to the configuration of the system may result in loss of a prior successful compliance. Product firmware or software can be updated in the field resulting in loss of compliance. Compliance status is a dynamic attribute of a product that is not easily assessed by a user ex-post-facto.

Publication of compliance information by an evaluation lab is often privacy sensitive as it may inform the industry relative to new product launch dates, product categorization information, and product inventories in the supply chain. Vendors and evaluation labs often enter into business agreements to keep sensitive compliance information secret—at least temporarily.

However, these conventional approaches do not consider changes in compliance status. Compliance status is important to Cloud, IoT and Edge orchestration systems that seek to verify compliance status of computing devices that may interact with a user's network. Compliance status is a trust vector that augments trusted computing objectives. However, an inability to obtain dynamic, machine readable status makes it impractical for orchestration and network onboarding tools to do a context sensitive check or to re-check status periodically.

The following system configuration and method operations demonstrate use of a public blockchain, a private network or blockchain, or a combination thereof to maintain compliance status information for one or more compliance providers. Compliance status may be synchronized across a number of compliance maintainer nodes that also serve as compliance publishing nodes according to a publish-and-subscribe system. Verifiers, such as onboarding orchestration tools may both query compliance status or be triggered by compliance status updates occurring dynamically within the supply chain ecosystem. Further, the following systems and methods provide orchestration tools that are more readily able to verify security and brand trust when devices enter a network or when loss of compliance is detected than previous solutions. Compliance has both interoperability and security implications that can change when firmware or software are updated and when compliance tests are modified. The following implementations more effectively accommodate compliance dynamism in a supply chain and in post deployment operations than previous solutions.

With an example usage of a blockchain, a device or service onboarding tool may have read access only to the blockchain, and a platform vendor or manufacturer may have only write access to the blockchain. The blockchain may be public or private, or both may be used. The private blockchain may include nonpublic supply chain information that is embargoed until a release date of a component of the device, for example, while the public blockchain includes public supply chain information. In another example, portions of a blockchain may be public while other portions are private (e.g., a set of blocks may include unique access rights or may encrypt private information using encryption keys known only to the vendor or manufacturer and the peer enforcing access rights). The blockchain may include information corresponding to platform certificates or approved product lists of a plurality of devices in an example.

Figure 10:
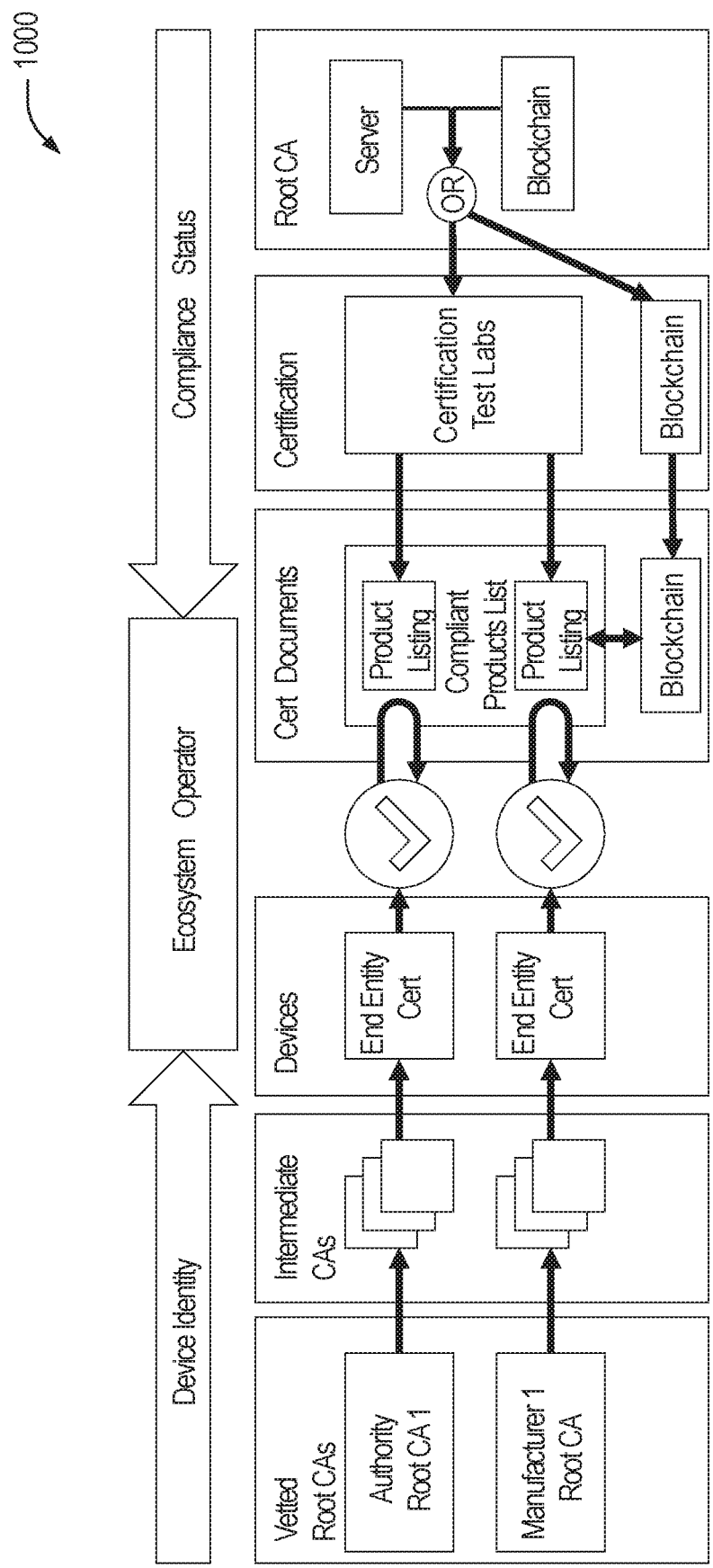
FIG. 10 illustrates a device identity verification process, usable with a blockchain, according to an example.

FIG. 10 illustrates a device identity verification implementation 1000, according to an example. In FIG. 10, an ecosystem operator acts as a controller or interface, such as between one or more devices and a certification entity or system, such as a blockchain or server. The ecosystem operator may be also implemented by an onboarding tool, device manufacturer or like service within the supply chain or post deployment management service.

The ecosystem operator may perform onboarding, commissioning, or may act as a verifier. The ecosystem operator may be augmented to include verifying other types of compliance, or evaluation results, such as conformance test labs results. The ecosystem operator may act as an interface or coordinator between a device and a blockchain, in an example, which is described in further detail below with respect to FIG. 11.

In the example shown in FIG. 10, the ecosystem operator may coordinate device identity with compliance certification. The compliance status results may be published generally using a server hosted database or with a blockchain. The blockchain processing nodes may additionally store certification information related to a device and host a database of compliance status results where the blockchain blocks may be used to verify the integrity of database contents. In an example, the blockchain may include or be associated with more than one blockchain, such as a public blockchain and a private blockchain. In an example, the public blockchain may be used for public compliance or device identification information and the private blockchain may be used for confidential, private, or time sensitive information (e.g., information to be published or made public after a date or event).

In an example, the ecosystem operator of FIG. 10 may be used to identify a device and determine whether the device is compliant with a particular ecosystem or standard. After the ecosystem operator determines a device identity or that a device has a particular certification, the ecosystem operator may allow the device access to a service or network (e.g., access a cloud, join a network, activate actions, etc.). In an example, device identification or end entity certification may include certification of a device's attributes, such as a vendor, model, version, or the like. The ecosystem operator may determine or assign a particular security level to a device based on certifications.

In an example, the device identity may be determined based on an asymmetric key pair embedded in the device at manufacturing time. A manufacturer or vendor may add attestation criteria, such as additional consideration/assurances/criteria to ensure that the embedded key is protected or verifiable. A Software Identification (SWID) tag (such as may be described in international standard ISO/IEC 19770-2:2015) may be used as a device identity (e.g., for a software subcomponent). A SWID tag includes a composite identifier containing "manufacturer", "model," and "version" information. The SWID may be used to disambiguate various software ingredients that make up a device or platform. In an example, a combination of SWID tags, SW hash values, and an asymmetric key may be used to create a device or platform identifier (e.g., using a Device Identifier Composition Engine (DICE) Architecture as described by the Trusted Computing Group).

A self-sovereign identity blockchain is a mechanism for individual assertion of identity (identifiers) that may be published through the blockchain such that blockchain members agree (or vote) regarding which asymmetric key possesses which identifier. A manufacturer of devices or platforms may assert sovereign device identity by using a device asymmetric key to sign a blockchain transaction containing the device identity. In an example, an infrastructure provider may generate a device identity according to ISO/IEC JTC 1/SC 27/WG 4 N 2391 specification and then contribute the device identity to a sovereign identity blockchain as another way of making device identity sovereign.

The ecosystem operator may access different ecosystems (e.g., use different root RCAs), to check signing of a device or devices. For example, the ecosystem operator may have multiple trust anchors that pertain to different ecosystems, such as standard compliance status, security assurances, identification verification, compliance status, Bluetooth compliance status, etc. In the example discussed further below using a blockchain, each authority may have a right to write to the blockchain on only its competency (e.g., a root CA may only write to certification status for a device, access to which may be controlled by the ecosystem operator). Each miner may have its own identity key, and may have a PKI on top of the identity key.

Maintaining a device identity with the blockchain allows multiple vendors to contribute to the platform (blockchain) when a device identifier is present for that vendor. For example, a secure storage device may have a cryptographic service provider or a hardware security module, key protection with physical isolation properties, or the like.

In an example, different components of a device may come online at different times. For example, a security module manufacturer may make product information available using the blockchain to publish existence of the module to allow others to know about the module and use it (or buy it). In another example, a component may need to be private, for example up to a release date (e.g., a secure element in a not-yet-released mobile device, manufacturer of the secure element may be hidden until the mobile device with the particular component is made public). The supply chain may have private interactions between supplier using a private blockchain separate from a public blockchain.

In an example, multiple logical devices may be stored on the platform (blockchain). For example, a platform identity may be registered for a device (e.g., an initial device ID), and use that platform identity as a single shared manufacturing identity. Different components (for example having different SWID tag values) may then be assigned (e.g., in an IoT software context) where each logical device (e.g., called local device id) may have its own id for blockchain and security identification (where device ID refers to the instance of the device and SWID refers to a class of software of which there may be multiple identical instantiations on different devices).

Figure 11:
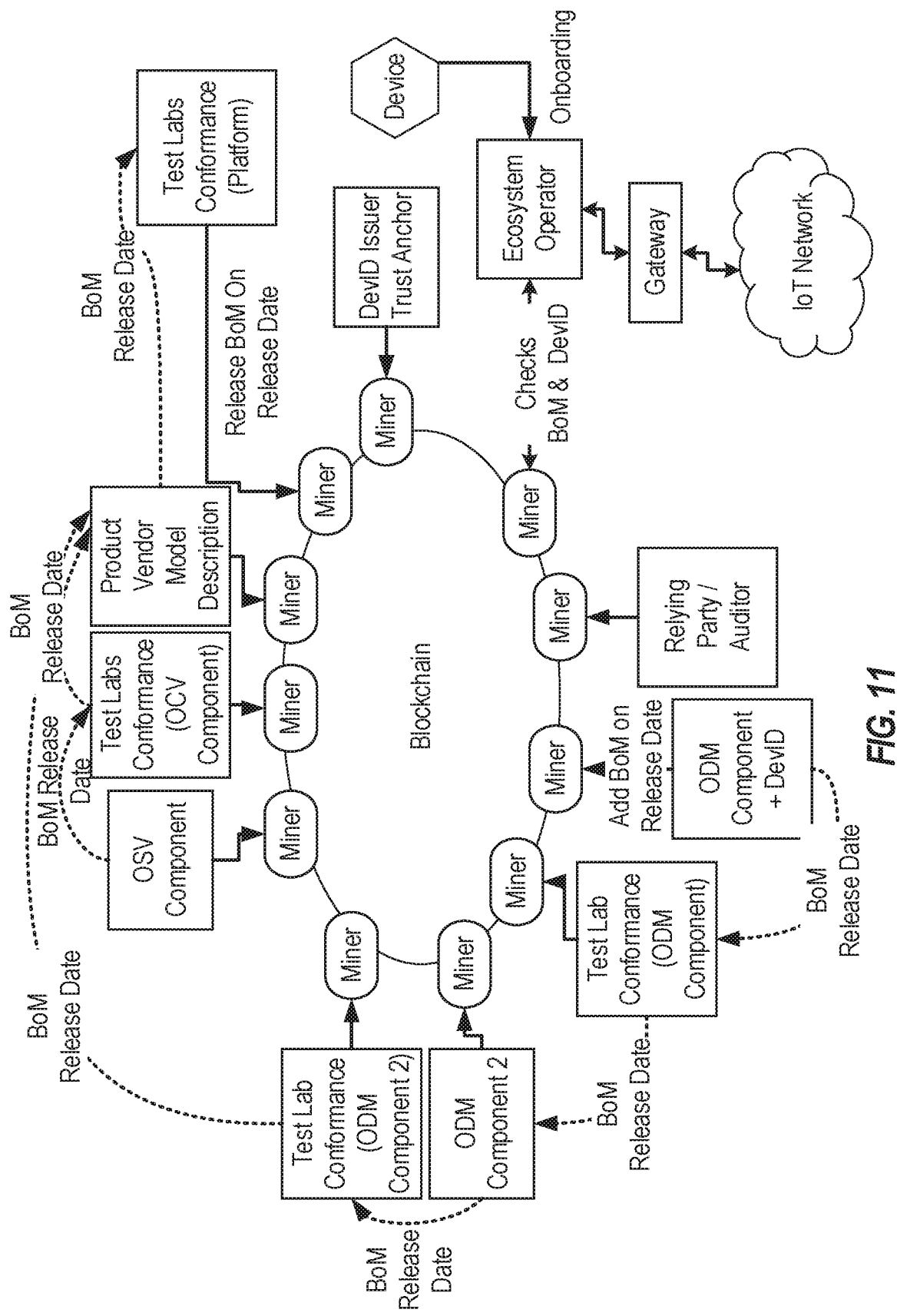
FIG. 11 illustrates an example blockchain implementation for validation of device identity information, according to an example.

FIG. 11 illustrates an example compliance blockchain implementation, according to an example. FIG. 11 shows an example of the blockchain and ecosystem operator described above in a supply chain provider ecosystem. In an example, the providers cooperate to coordinate the release of a vendor product including multiple component ingredients (e.g. hardware, firmware, software and DeviceID) such as defined by a Bill-of-materials (BoM). In an example, a target release date of the vendor's product is agreed to remain private (e.g., not disclosed to a public blockchain until the target date passes). This ensures that entities monitoring the blockchain do not infer a product release date or expected quantities of a particular product. For private aspects of the ecosystem, a separate private blockchain or private portion of a blockchain may be provided. In an example, the private blockchain may be represented by the dotted lines, with the public blockchain represented by solid lines. In an example, the private blockchain remains private until the BoM release date, after which aspects of (or the entire) private blockchain may become public.

Subsequent to the release date, ingredient suppliers may contribute component information to the blockchain for public use. For example, the Ecosystem Operator may validate product ingredients to match an existing product BoM as a condition of onboarding.

An ingredient or component supplier may release an ingredient or component for general use at any time if not constrained by a product vendor agreement that specifies a release date in the future. Other ingredient or component suppliers or product vendors may incorporate the first ingredient or component into a second or into a final product by linking the second ingredient or component BoM to the first ingredient or component BoM found on the blockchain. A BoM also may include the supplier, model, version, and other information such as a hash of firmware/software associated with the ingredient or component.

Each ingredient or component may be evaluated by an ingredient or component test and compliance validation service provider that contributes evaluation results/status to the blockchain. Evaluation labs may also be constrained by release date contracts that prevent premature disclosure of evaluated ingredients, components or platforms to the public blockchain.

A DeviceID issuing authority may generate one or many unique device identifiers, for example one for each instance of a product or ingredient included in a product such that the final product contains at least one DeviceID. The issuer may generate a document that associates the DeviceID instance with the ingredient or product (e.g. a model number that is specific to the ingredient or product—and can be regarded as a class identifier). The issuer digitally signs the document that is contributed to the blockchain establishing a binding or association of the ingredient instance to the ingredient model (or class). The DeviceID may be used as an instance identifier. The signed document may be regarded as a Digital Certificate such as is defined by RFC 5280 (X.509) or a signed document as defined by RFC 8152 (COSE).

Release of the DeviceID and model signed document to the blockchain may be constrained by the release date agreement. The DeviceID issuer may supply a trust anchor (e.g., a hash of a public issuing key) to the blockchain, which may be controlled by the ecosystem operator. For example, the issuer may be an X.509 PKI Certificate Authority or may be a record in an infrastructure provider directory and may publish its root CA public key or directory location to facilitate onboarding verification by the ecosystem operator.

Subsequent to a release date, all the ingredients or components necessary to support an onboarding operation by the ecosystem operator using the blockchain are in place. The ecosystem operator (EO) onboarding process may query the device to be onboarded to identify a product model number. The EO may use the product model number to locate a BoM record from the blockchain that in turn identifies other BoM records in a cascade of references that together defines the product ingredients.

In an example, at least one of these ingredients contains an embedded DeviceID (e.g., IEEE 802.1AR) that may be used to digitally sign and otherwise prove to the EO that it has possession of the private key portion. For example, the ingredient may be a TCG Trusted Platform Module (TPM) that contains the DeviceID and TCG defined restricted keys that may attest the presence of the DeviceID on the TPM which has known key protection properties.

The EO may further require the device to be onboarded to sign the BoM that describes the product composition and may further engage in a key exchange protocol such as TLS or Diffie-Hellman to establish a secure communications channel between the EO and the device being onboarded.

The EO may verify the DeviceID signature by obtaining the issuer public key, generating a hash of the BoM or digital certificate and comparing the encrypted hash with the signature associated with the signed document. It is understood that a contribution of a BoM to the blockchain may constitute a digital signing operation using the contributors private key. The contributor may further contribute a digital identity certificate containing identification attributes such as the vendor's name.

The EO may verify all signed BoM documents and the identities of BoM ingredient providers according to a list of trusted keys also known as trust anchors. The EO may construct the trust anchor list by observing blockchain transactions involving the various ingredient providers to establish trustworthiness in the blockchain participants. Additionally, a first trusted participant may introduce a second participant to the EO and in so doing conveys trust in the second participant.

The EO may further verify the ingredient BoM by comparing a BoM supplied by the device with a BoM found on the blockchain where a corresponding test lab may contribute a test status result.

The EO may further verify the device authenticity by requesting a device attestation where a secure/measured/protected boot process (e.g., TCG Measured Boot) result produces a hash value or values that matches hash values supplied as part of one or more ingredient BoMs found on the blockchain. The EO may apply a whitelist, blacklist or greylist policy based on BoM hash values found on the blockchain such that a whitelist hash authorizes onboarding to continue, blacklist policy prohibits onboarding continuation and greylist triggers auditing, containment or other remedial action to limit the exposure of the device to other already onboarded devices. For example, Network Access Control (NAC), Network Access Protection (NAP), Trusted Network Communications (TNC), RADIUS and 802.1X.

In an example, the DeviceID may be an Enhanced Privacy ID (EPID) to be used as a device identifier. The private blockchain or aspects of the blockchain kept private until the BoM release date may include a permission blockchain to coordinate nonpublic supply chain information to maintain privacy until the release date. The permission blockchain may include a subset of members or venders with permission read or permission write that only have access when allowed by the ecosystem operator, for example. The permission blockchain may allow for supply chain participants to have write access to the blockchain, and the ecosystem operator to have read access only. In an example, the read access may be removed from the ecosystem operator for a permission blockchain to keep the information private.

As is understood, a blockchain is a distributed data store (e.g., distributed ledger or data storage system) that maintains a growing list of data records that are hardened against tampering and revision. A blockchain includes "blocks," which hold data or both data and programs. Each block holds batches of individual "transactions" between blockchain participants. Each block includes a timestamp and linking information (usually a hash value) linking the current block to the previous block: the linking information allows traversal of the blockchain (in either direction).

Blockchain transactions may be integrity protected using a distributed hashing algorithm that requires each transaction processor (e.g., "miner") to agree to the next block in the blockchain. Integrity is achieved through a consensus of multiple miners (e.g., via a vote), each miner having access to its own copy of the ledger. If a majority of the miners agree on the contents of the ledger, then those agreed upon contents become the "truth" for the ledger: the miners that disagree will accept the truth of the majority. Integrity is provable because an attacker would have to compromise a majority of miners and modify their copies of the ledger; this is extremely difficult (if not impossible).

In an example, the blockchain implementation may involve use transactions performed among participants to enable of zero knowledge commitments, and zero knowledge proof of knowledge of verification, using information written to the blockchain. Such techniques may allow enhanced privacy of data written to the blockchain in connection with network operations (e.g., to keep details of contracts or network participants secret). In an example, a zero knowledge proof applied in this scenario includes steps—(1) commitment of secret data to the blockchain, and (2) proof of knowledge of the secret data, using a cryptographic protocol.

Figure 12:
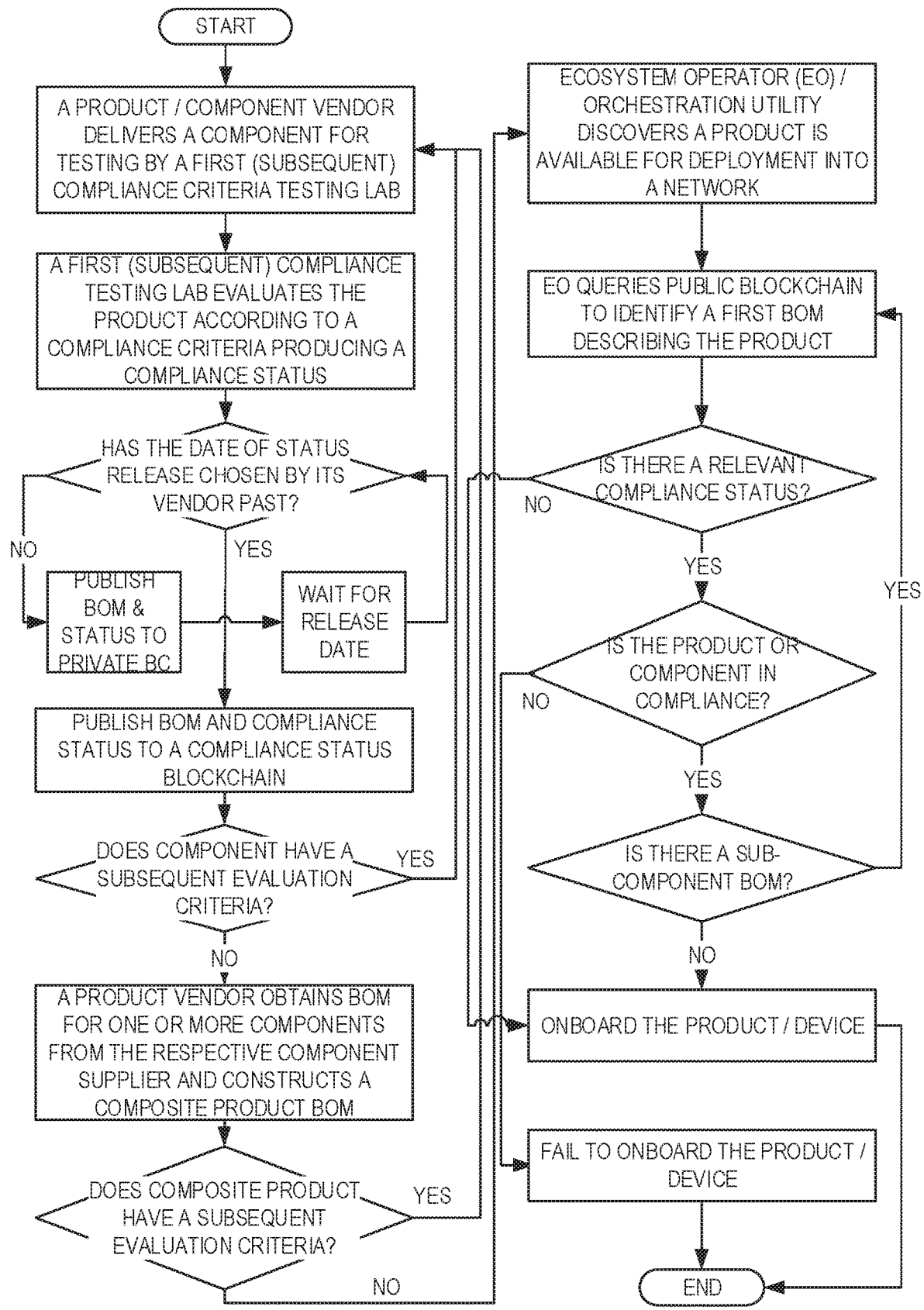
FIG. 12 illustrates a flowchart showing a technique for conformance testing using a blockchain, according to an example.

FIG. 12 illustrates a flowchart showing a technique for conformance testing using a blockchain, according to an example. FIG. 12 illustrates a method showing how a supplier in the ecosystem may submit a component for conformance testing using a public or private blockchain. A component vendor may restrict publication of the component to a public blockchain (or other public disclosure) according to a business contract. A BoM describing the component may be communicated to a second component or product that may construct a second BoM consisting in part of the first BoM. The resulting second BoM may be given to a compliance evaluation lab where a similar process for testing compliance and public disclosure is applied.

A compliant product may be available for onboarding into a user's network using an orchestration tool (e.g., ecosystem operator) that evaluates whether the product's compliance status is current. Compliance status may relate to individual sub-components of the composite product, and when relevant, the sub-component compliance status may also be checked. When all relevant status checks satisfy an orchestration policy, the product (device) is permitted on the network.

In an example, the orchestration tools may re-verify status periodically or in response to dynamic updates to the public blockchain regarding status changes. According to the technique of FIG. 12, a product or component vendor delivers a component for testing by a first or subsequent compliance criteria testing lab. A first or subsequent compliance testing lab evaluates the product according to a compliance criteria producing a compliance status. The technique checks whether the date of status release chosen by its vendor is in the past. When the date is in the future, the technique publishes BoM and status to a private blockchain and waits for the release date.

When the date is past, the technique publishes the BoM and compliance status to a compliance status blockchain (e.g., public blockchain). The technique determines whether the component has a subsequent evaluation criteria, and when it does, repeats the previous operations for that criteria. When all criteria are satisfied, a product vendor obtains the BoM for one or more components form the respective component supplier(s) and constructs a composite product BoM. When the composite product itself has a subsequent evaluation criteria, the above operations may be repeated.

When all subsequent evaluation criteria are satisfied, the ecosystem operator discovers a product is available for deployment into a network. The ecosystem operator queries the public blockchain to identify a first BoM describing the product. The ecosystem operation may check whether there is a relevant compliance status, whether the product or component is in compliance, and whether any subcomponents have a BoM or compliance statuses that need checking. After verification of the product, component, or sub-components are complete, the ecosystem operator may onboard the product or device. When a product, component, subcomponent, or device is not in compliance, the ecosystem operator may fail to onboard the product, component, subcomponent, or device (e.g., reject an onboarding request).

Figure 13:
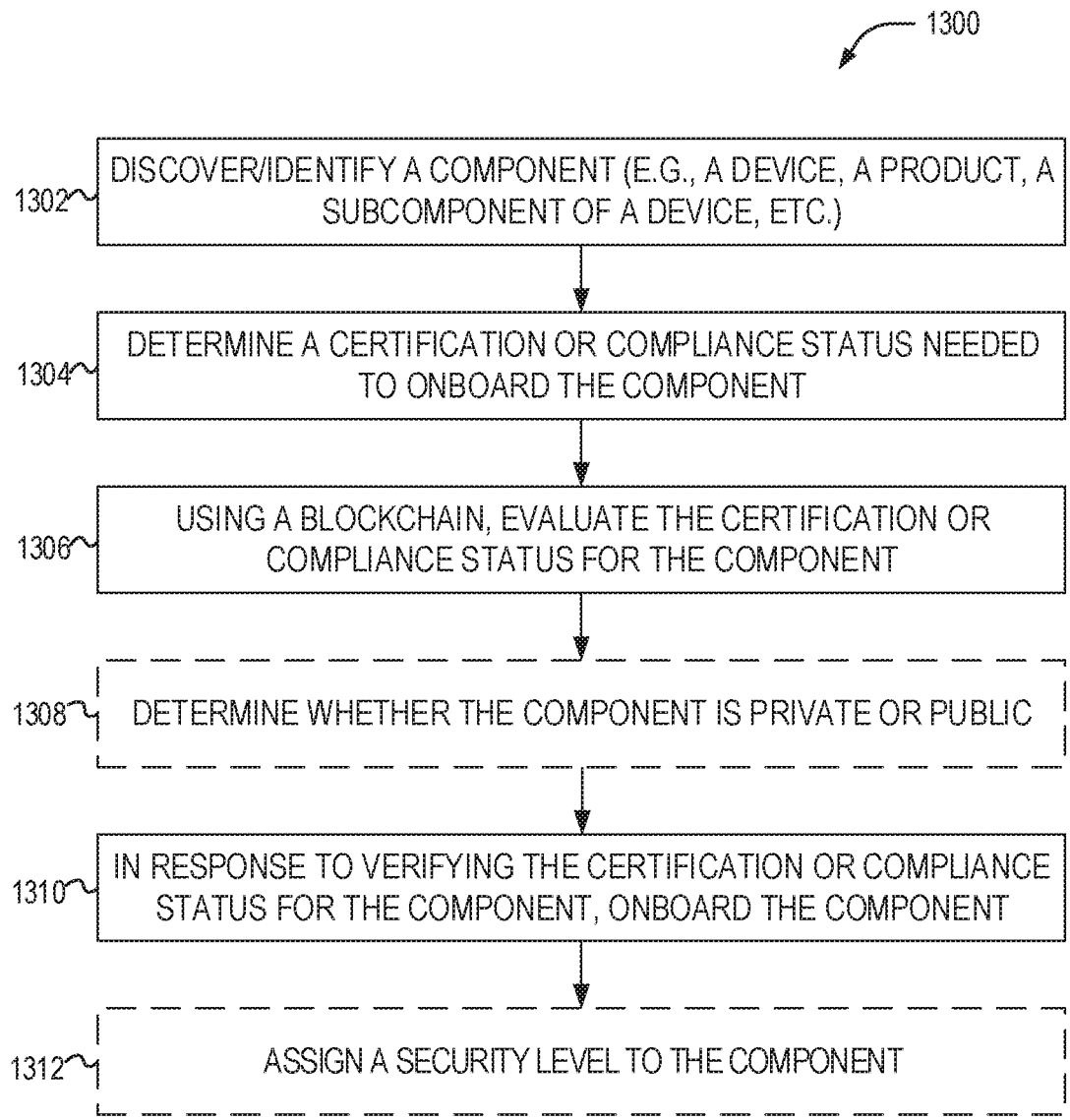
FIG. 13 illustrates a flowchart showing a technique for verifying compliance status of a device, product, component, or subcomponent using a blockchain, according to an example.

FIG. 13 illustrates a flowchart showing a technique 1300 for verifying a device identification, certification, or compliance status of a device, product, component, or subcomponent using a blockchain, according to an example.

The technique 1300 includes an operation 1302 to discover/identify a component (e.g., a device, a product, a subcomponent of a device, etc.).

The technique 1300 includes an operation 1304 to determine a certification or compliance status (e.g., OCF certification) needed to onboard the component.

The technique 1300 includes an operation 1306 to, using a blockchain (which may be public or private, such as with respect to a release date), evaluate the certification or compliance status for the component.

The technique 1300 includes an optional operation 1308 to determine whether the component is private or public.

The technique 1300 includes an operation 1310 to, in response to verifying the certification or compliance status for the component, onboard the component. When the certification or compliance status (or device identity) is not verified or not verifiable, the technique 1300 may include not onboarding the component.

The technique 1300 concludes with an optional operation 1312 to assign a security level to the component (e.g., based on certification or compliance status).

As noted in the discussion above, the techniques discussed herein may be applicable to use with MEC and like Fog architectures, including those defined by ETSI MEC specifications and like standards bodies. MEC technology permits flexible and rapid deployments of innovative applications and services towards mobile subscribers, enterprises, or vertical segments. For example, regarding the automotive sector, applications such as V2X (e.g., IEEE 802.11p, or 3GPP LTE C-V2X) exchange data, provide data to aggregation points, or access data in databases, to ascertain an overview of the local situation derived from a multitude of sensors (e.g., by various cars, roadside units, etc.). As will be appreciated, the presently described validation architecture and reputation service are suited for integration within uses of a MEC or Fog-based system or facility, implemented with hardware and software resources.

Figure 14:
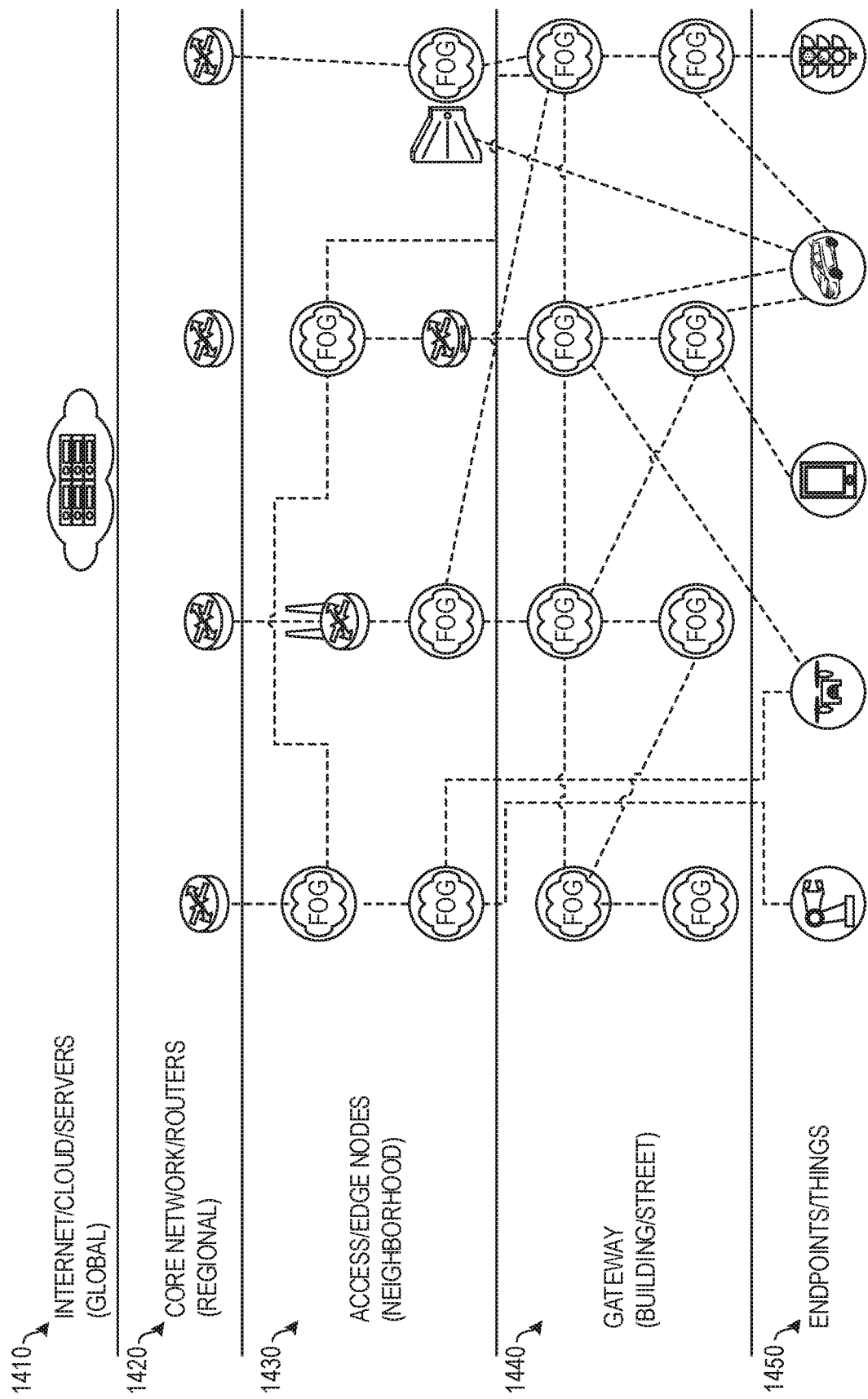
FIG. 14 illustrates a MEC and Fog network topology, according to an example.

FIG. 14 illustrates a MEC and Fog network topology, according to an example. This network topology, which includes a number of conventional networking layers, may be extended through use of the tags and objects discussed herein. Specifically, the relationships between endpoints (at endpoints/things network layer 1450), gateways (at gateway layer 1440), access or edge computing nodes (e.g., at neighborhood nodes layer 1430), core network or routers (e.g., at regional or central office layer 1420), may be represented through the use of linked objects and tag properties.

A Fog network (e.g., established at gateway layer 1440) may represent a dense geographical distribution of near-user edge devices (e.g., Fog nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 14 illustrates a general architecture that integrates a number of MEC and FOG nodes-categorized in different layers (based on their position, connectivity and processing capabilities, etc.). It will be understood, however, that such Fog nodes may be replaced or augmented by edge computing processing nodes.

Fog nodes may be categorized depending on the topology and the layer where they are located. In contrast, from a MEC standard perspective, each Fog node may be considered as a mobile edge (ME) Host, or a simple entity hosting a ME app and a light-weighted ME Platform. In an example, a MEC or Fog node may be defined as an application instance, connected to or running on a device (ME Host) that is hosting a ME Platform. Here, the application consumes MEC services and is associated to a ME Host in the system. The nodes may be migrated, associated to different ME Hosts, or consume MEC services from other (e.g., local or remote) ME platforms.

In contrast to this approach, traditional client. V2V, and other network applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead.

Depending on the real-time requirements in the applicable communications context, a hierarchical structure of data processing and storage nodes may be defined. For example, including local ultra-low-latency processing, regional storage and processing as well as remote cloud data-center based storage and processing. SLAs. and KPIs, and other measures discussed herein may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 15:
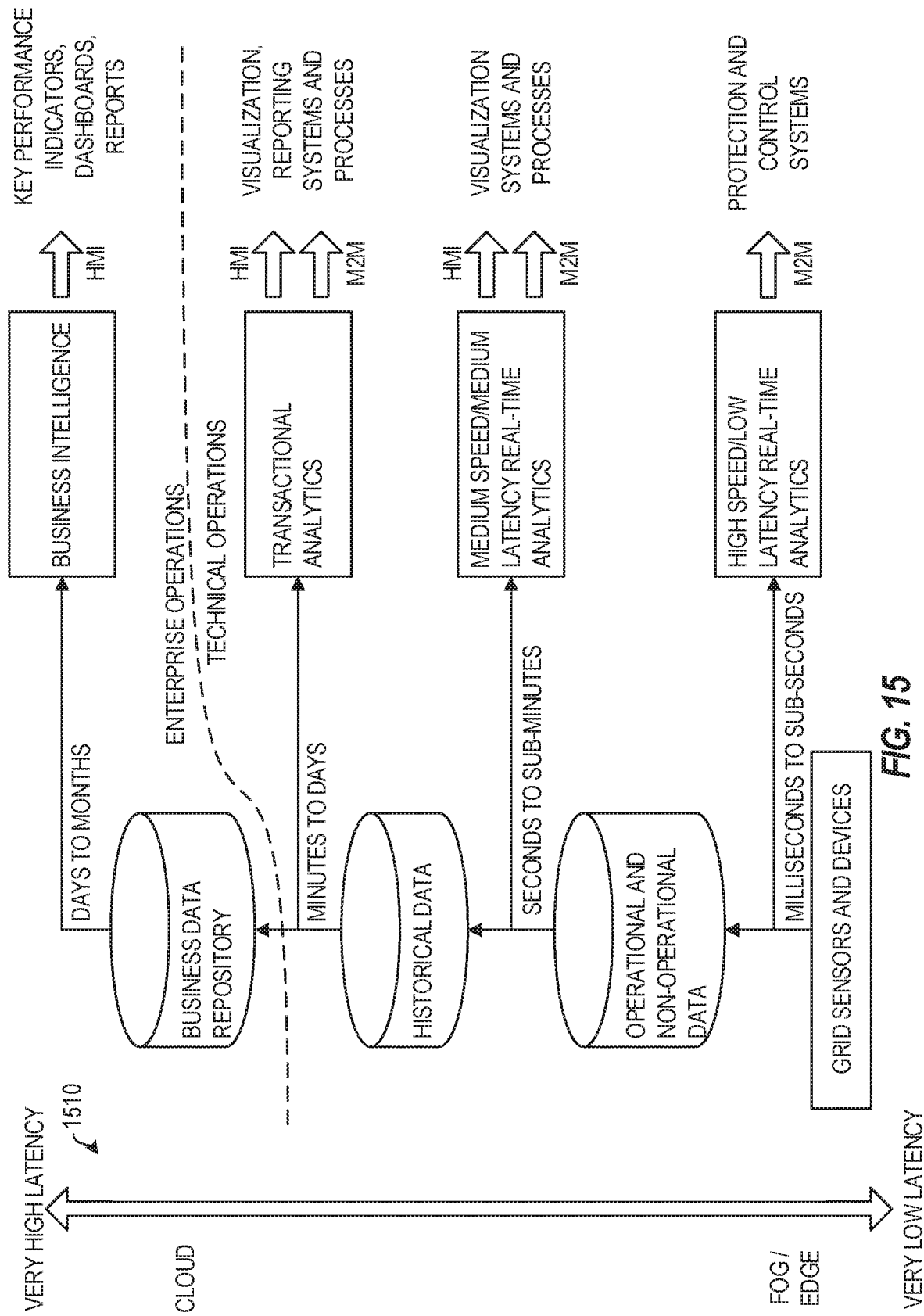
FIG. 15 illustrates processing and storage layers in a MEC and Fog network, according to an example.

FIG. 15 illustrates processing and storage layers in a MEC and Fog network, according to an example. The illustrated data storage or processing hierarchy 1510 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of hierarchy is storage shared across MEC components. For example, data is shared between distinct pools of vehicles that are in range of each other.

The fifth level of hierarchy is fixed infrastructure storage, such as in RSUs. This level may aggregate data from entities in hierarchy levels 1-4. The sixth level of hierarchy is storage across fixed infrastructure. This level may, for example, be located in the Core Network of a telecommunications network, or an enterprise cloud. Other types of layers and layer processing may follow from this example.

Figure 16:
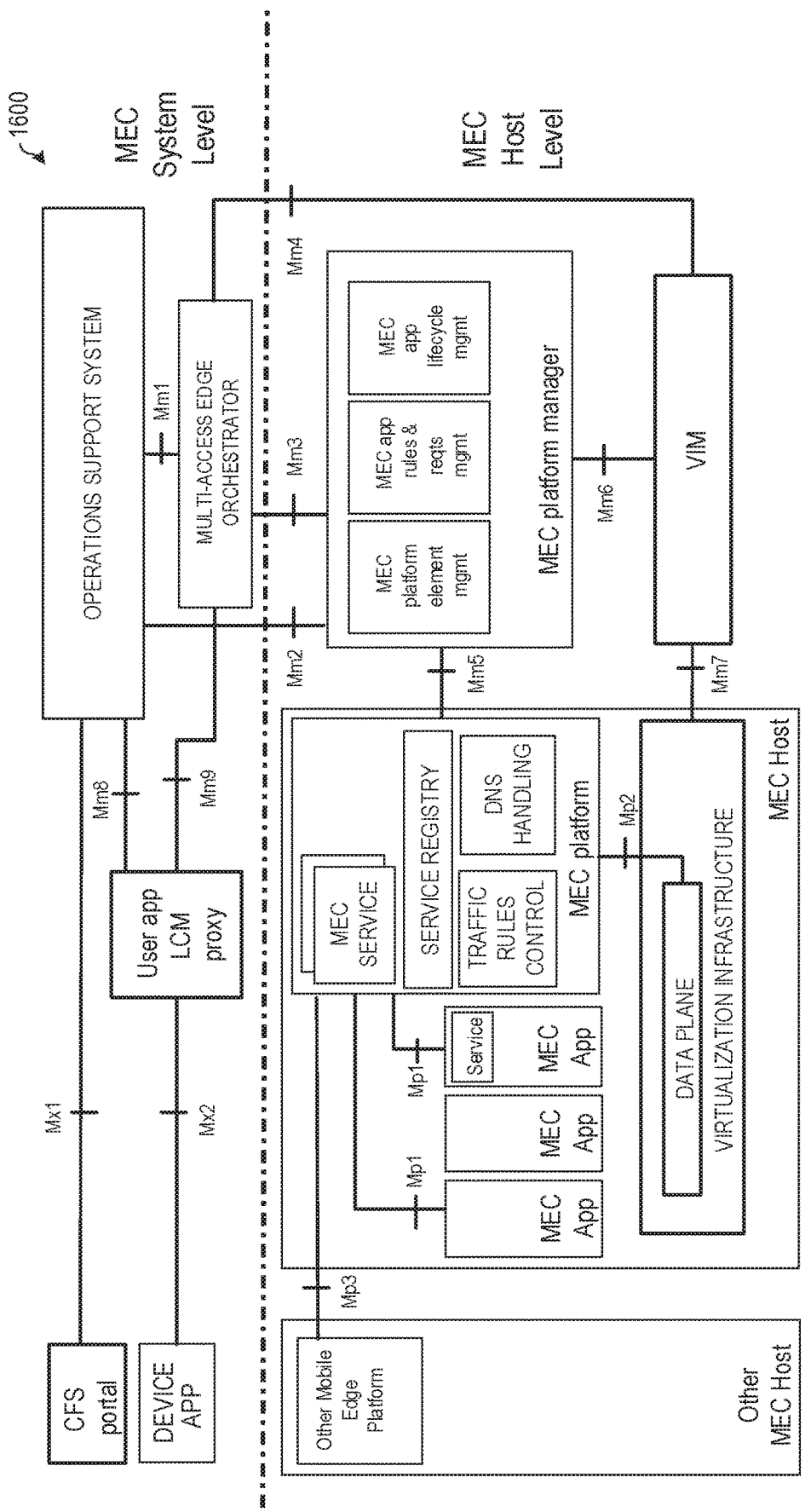
FIG. 16 illustrates a block diagram for a MEC system architecture, according to an example.

FIG. 16 depicts a block diagram for an example MEC system architecture in which any one or more of the techniques (e.g., operations, processes, methods, and methodologies) discussed herein may be performed. In an example, the MEC system architecture may be defined according to a specification, standard, or other definition (e.g., according to the ETSI GS MEC 003 specification). In this diagram. Mp reference points refer to MEC platform functionality; Mm reference points refer to management; and Mx refers to connections to external entities. The services, applications, orchestrators, and other entities discussed herein (e.g., features of the edge service, reputation service, etc. discussed in FIGS. 3 to 8) may be implemented at any number of the entities of the MEC system architecture depicted in FIG. 16, and the communications to perform network operations may be implemented at any number of the interfaces of the MEC system architecture depicted in FIG. 16.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18. Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication Systen Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC. Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®. Wireless Gigabit Alliance (WiGig) standard, mmWave standards in general (wireless systems operating at 10-300 GHz and above such as WiGig, IEEE 802.1 lad, IEEE 802.1 lay, etc.), technologies operating above 300 GHz and THz bands, (3GPP/LTE based or IEEE 802.1 p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e, the European flavor of IEEE 802.11p based DSRC, including ITS-G5A (i.e., Operation of ITS-G5 in European ITS frequency bands dedicated to ITS for safety re-lated applications in the frequency range 5,875 GHz to 5.905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)). DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz., 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/ax) and also by Bluetooth), 2500-2690 MHz., 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum. IMT-2020 spectrum (expected to include 3600-3800 MHz, 3.5 GHz bands. 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig: in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.]. Some of the features in this document are defined for the network side, such as Access Points, eNodeBs, New Radio (NR) or next generation Node Bs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

Figure 17:
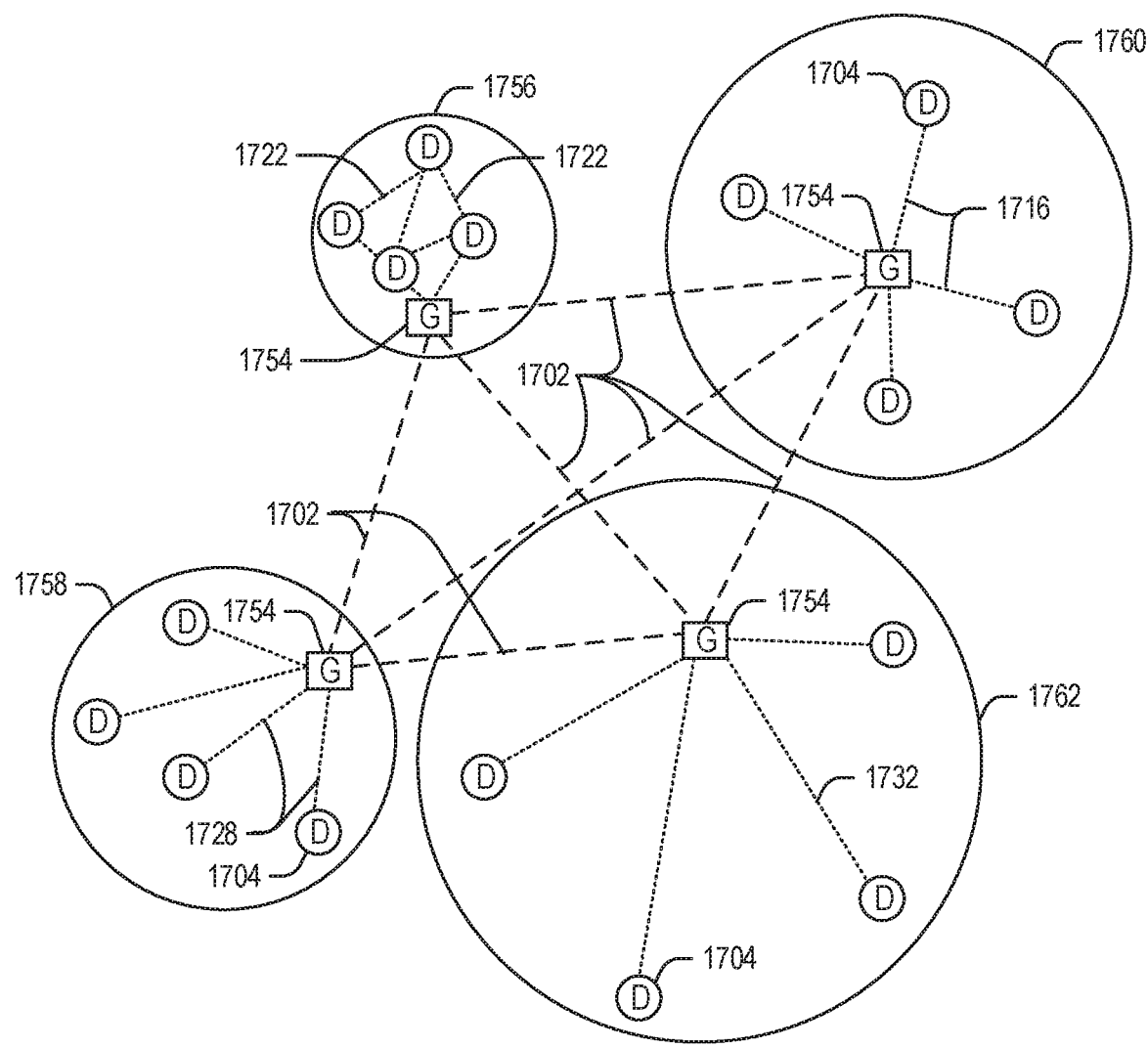
FIG. 17 illustrates a domain topology for respective device networks (e.g., internet-of-things (IoT) device networks) coupled through links to respective gateways, according to an example.

In further examples, the preceding examples of network communications and operations (e.g., with edge device deployments) may be integrated with IoT and like device-based network architectures. FIG. 17 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

MEC and other Edge computing use cases have been envisioned to integrate into a number of network and application settings, including those to support network arrangements of IoT deployments. IoT devices are physical or virtualized objects that may communicate on a network (typically at the edge or endpoint of a network), and may include sensors, actuators, and other input/output components, such as to collect data or perform actions from a real world environment. For example, IoT devices may include low-powered devices that are embedded or attached to everyday things, such as buildings, vehicles, packages, etc., to provide sensor, data, or processing functionality. Recently, IoT devices have become more popular and thus applications and use cases using these devices have proliferated.

Various standards have been proposed to more effectively interconnect and operate IoT devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, IoT devices are limited in memory, size, or functionality, enabling larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on QoS terms specified in SLA and service delivery agreements. As will be understood, the use of IoT devices and networks present a number of new challenges in a heterogeneous network of connectivity comprising a combination of wired and wireless technologies.

FIG. 17 specifically provides a simplified drawing of a domain topology that may be used for a number of IoT networks comprising IoT devices 1704, with the IoT networks 1756, 1758, 1760, 1762, coupled through backbone links 1702 to respective gateways 1754. For example, a number of IoT devices 1704 may communicate with a gateway 1754, and with each other through the gateway 1754. To simplify the drawing, not every IoT device 1704, or communications link (e.g., link 1716, 1722, 1728, or 1732) is labeled. The backbone links 1702 may include any number of wired or wireless technologies, including optical networks, and may be part of a local area network (LAN), a wide area network (WAN), or the Internet. Additionally, such communication links facilitate optical signal paths among both IoT devices 1704 and gateways 1754, including the use of MUXing/deMUXing components that facilitate interconnection of the various devices.

The network topology may include any number of types of IoT networks, such as a mesh network provided with the network 1756 using Bluetooth low energy (BLE) links 1722. Other types of IoT networks that may be present include a wireless local area network (WLAN) network 1758 used to communicate with IoT devices 1704 through IEEE 802.11 (Wi-Fi) links 1728, a cellular network 1760 used to communicate with IoT devices 1704 through an LTE/LTE-A (4G) or 5G cellular network, and a low-power wide area (LPWA) network 1762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1704, such as over the backbone links 1702, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 1756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1758, for instance, may use systems that perform standards conversion to provide multi-standard connectivity, enabling IoT devices 1704 using different protocols to communicate. Further systems may provide seamless interconnectivity across a multi-standard infrastructure comprising visible Internet resources and hidden Internet resources.

Communications in the cellular network 1760, for instance, may be enhanced by systems that offload data, extend communications to more remote devices, or both. The LPWA network 1762 may include systems that perform non-Internet protocol (IP) to IP interconnections, addressing, and routing. Further, each of the IoT devices 1704 may include the appropriate transceiver for wide area communications with that device. Further, each IoT device 1704 may include other transceivers for communications using additional protocols and frequencies. This is discussed further with respect to the communication environment and hardware of an IoT processing device depicted in FIGS. 19 and 20.

Finally, clusters of IoT devices may be equipped to communicate with other IoT devices as well as with a cloud network. This may enable the IoT devices to form an ad-hoc network between the devices, enabling them to function as a single device, which may be termed a fog device, fog platform, or fog network. This configuration is discussed further with respect to FIG. 18 below.

Figure 18:
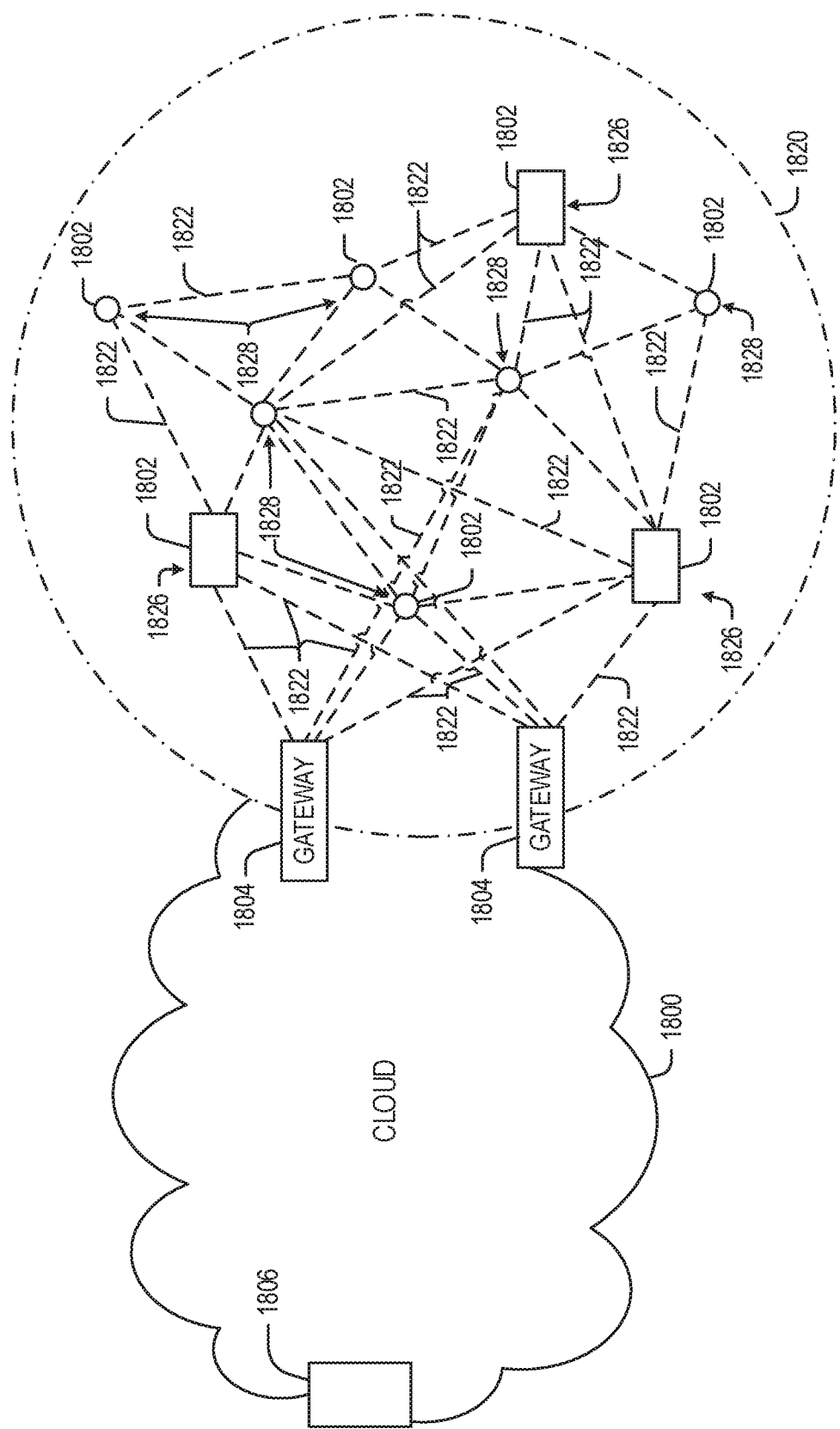
FIG. 18 illustrates a cloud-computing network in communication with a mesh network of IoT/endpoint devices operating as a Fog device at the edge of the cloud-computing network, according to an example.

FIG. 18 illustrates a cloud computing network in communication with a mesh network of IoT devices (devices 1802) operating as a fog platform in a networked scenario. The mesh network of IoT devices may be termed a fog network 1820, established from a network of devices operating at the edge of the cloud 1800. To simplify the diagram, not every IoT device 1802 is labeled.

The fog network 1820 may be considered to be a massively interconnected network wherein a number of IoT devices 1802 are in communications with each other, for example, by radio links 1822. The fog network 1820 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 1820 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 1802 are shown in this example, gateways 1804, data aggregators 1826, and sensors 1828, although any combinations of IoT devices 1802 and functionality may be used. The gateways 1804 may be edge devices that provide communications between the cloud 1800 and the fog 1820, and may also provide the backend process function for data obtained from sensors 1828, such as motion data, flow data, temperature data, and the like. The data aggregators 1826 may collect data from any number of the sensors 1828, and perform the back end processing function for the analysis. The results, raw data, or both may be passed along to the cloud 1800 through the gateways 1804. The sensors 1828 may be full IoT devices 1802, for example, capable of both collecting data and processing the data. In some cases, the sensors 1828 may be more limited in functionality, for example, collecting the data and enabling the data aggregators 1826 or gateways 1804 to process the data.

Communications from any IoT device 1802 may be passed along a convenient path (e.g., a most convenient path) between any of the IoT devices 1802 to reach the gateways 1804. In these networks, the number of interconnections provide substantial redundancy, enabling communications to be maintained, even with the loss of a number of IoT devices 1802. Further, the use of a mesh network may enable IoT devices 1802 that are very low power or located at a distance from infrastructure to be used, as the range to connect to another IoT device 1802 may be much less than the range to connect to the gateways 1804.

The fog 1820 provided from these IoT devices 1802 may be presented to devices in the cloud 1800, such as a server 1806, as a single device located at the edge of the cloud 1800, e.g., a fog device. In this example, the alerts coming from the fog device may be sent without being identified as coming from a specific IoT device 1802 within the fog 1820. In this fashion, the fog 1820 may be considered a distributed platform that provides computing and storage resources to perform processing or data-intensive tasks such as data analytics, data aggregation, and machine-learning, among others.

In some examples, the IoT devices 1802 may be configured using an imperative programming style, e.g., with each IoT device 1802 having a specific function and communication partners. However, the IoT devices 1802 forming the fog device may be configured in a declarative programming style, enabling the IoT devices 1802 to reconfigure their operations and communications, such as to determine needed resources in response to conditions, queries, and device failures. As an example, a query from a user located at a server 1806 about the operations of a subset of equipment monitored by the IoT devices 1802 may result in the fog 1820 device selecting the IoT devices 1802, such as particular sensors 1828, needed to answer the query. The data from these sensors 1828 may then be aggregated and analyzed by any combination of the sensors 1828, data aggregators 1826, or gateways 1804, before being sent on by the fog 1820 device to the server 1806 to answer the query. In this example, IoT devices 1802 in the fog 1820 may select the sensors 1828 used based on the query, such as adding data from flow sensors or temperature sensors. Further, if some of the IoT devices 1802 are not operational, other IoT devices 1802 in the fog 1820 device may provide analogous data, if available.

In other examples, the operations and functionality described above may be embodied by an IoT device machine in the example form of an electronic processing system, within which a set or sequence of instructions may be executed to cause the electronic processing system to perform any one of the methodologies discussed herein, according to an example. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, these and like examples to a processor-based system shall be taken to include any set of one or more machines that are controlled by or operated by a processor, set of processors, or processing circuitry (e.g., a machine in the form of a computer, UE, MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 19:
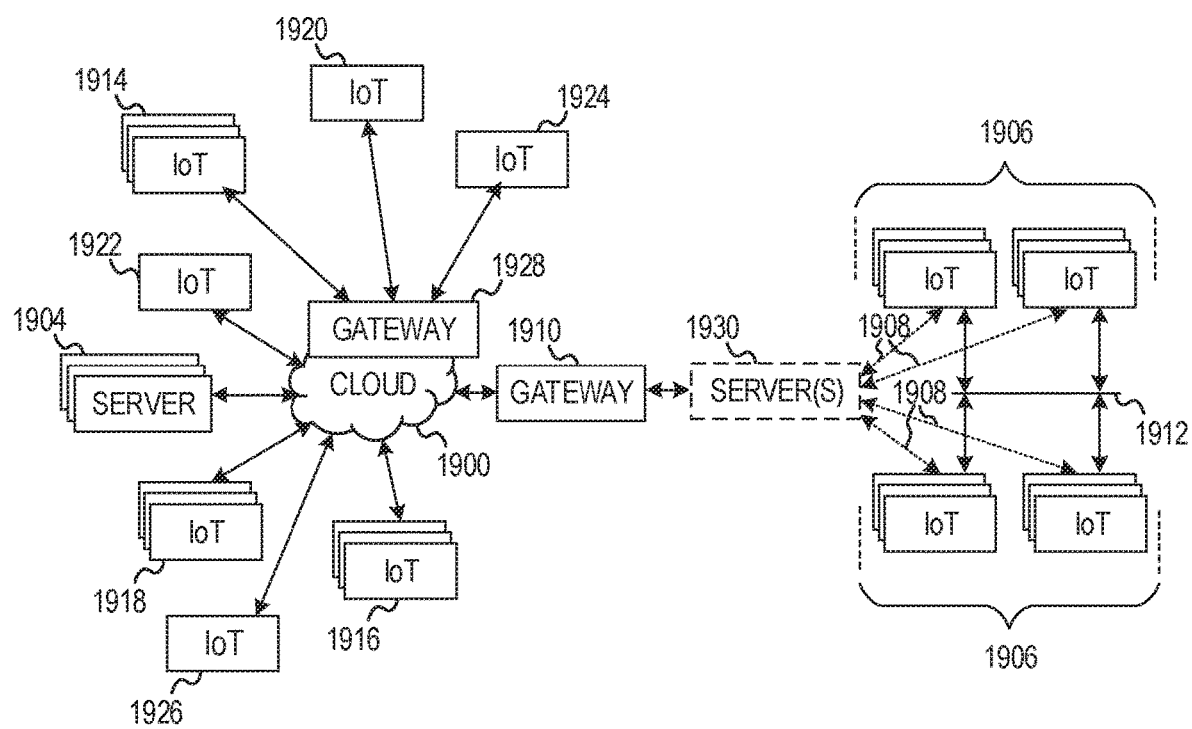
FIG. 19 illustrates a block diagram of a network illustrating communications among a number of IoT/endpoint devices, according to an example.

FIG. 19 illustrates a drawing of a cloud computing network, or cloud 1900, in communication with a number of IoT devices. The cloud 1900 may represent the Internet, or may be a local area network (LAN), or a wide area network (WAN), such as a proprietary network for a company. The IoT devices may include any number of different types of devices, grouped in various combinations. For example, a traffic control group 1906 may include IoT devices along streets in a city. These IoT devices may include stoplights, traffic flow monitors, cameras, weather sensors, and the like. The traffic control group 1906, or other subgroups, may be in communication with the cloud 1900 through wired or wireless links 1908, such as LPWA links, optical links, and the like. Further, a wired or wireless sub-network 1912 may allow the IoT devices to communicate with each other, such as through a local area network, a wireless local area network, and the like. The IoT devices may use another device, such as a gateway 1910 or 1928 to communicate with remote locations such as the cloud 1900; the IoT devices may also use one or more servers 1930 to facilitate communication with the cloud 1900 or with the gateway 1910. For example, the one or more servers 1930 may operate as an intermediate network node to support a local edge cloud or fog implementation among a local area network. Further, the gateway 1928 that is depicted may operate in a cloud-to-gateway-to-many edge devices configuration, such as with the various IoT devices 1914, 1920, 1924 being constrained or dynamic to an assignment and use of resources in the cloud 1900.

Other example groups of IoT devices may include remote weather stations 1914, local information terminals 1916, alarm systems 1918, automated teller machines 1920, alarm panels 1922, or moving vehicles, such as emergency vehicles 1924 or other vehicles 1926, among many others. Each of these IoT devices may be in communication with other IoT devices, with servers 1904, with another IoT fog platform or system, or a combination therein. The groups of IoT devices may be deployed in various residential, commercial, and industrial settings (including in both private or public environments).

As may be seen from FIG. 19, a large number of IoT devices may be communicating through the cloud 1900. This may allow different IoT devices to request or provide information to other devices autonomously. For example, a group of IoT devices (e.g., the traffic control group 1906) may request a current weather forecast from a group of remote weather stations 1914, which may provide the forecast without human intervention. Further, an emergency vehicle 1924 may be alerted by an automated teller machine 1920 that a burglary is in progress. As the emergency vehicle 1924 proceeds towards the automated teller machine 1920, it may access the traffic control group 1906 to request clearance to the location, for example, by lights turning red to block cross traffic at an intersection in sufficient time for the emergency vehicle 1924 to have unimpeded access to the intersection.

Clusters of IoT devices, such as the remote weather stations 1914 or the traffic control group 1906, may be equipped to communicate with other IoT devices as well as with the cloud 1900. This may allow the IoT devices to form an ad-hoc network between the devices, allowing them to function as a single device, which may be termed a fog platform or system (e.g., as described above with reference to FIG. 18).

Figure 20:
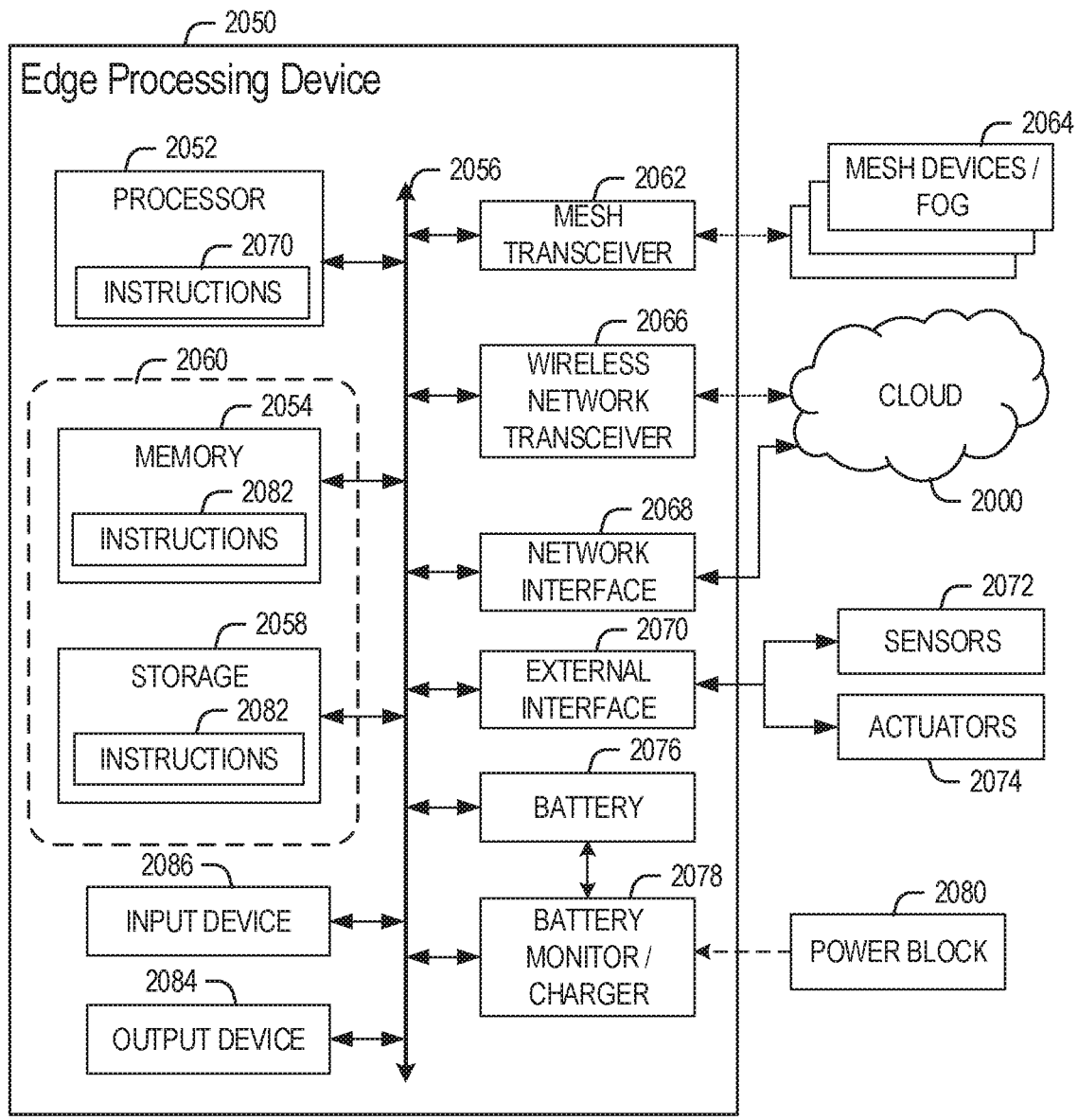
FIG. 20 illustrates a block diagram for an example device architecture upon which any one or more of the techniques (e.g., operations, processes, methods, and methodologies) discussed herein may be performed, according to an example.

FIG. 20 is a block diagram of an example of components that may be present in an edge processing device 2050 (e.g., a computer, IoT device, edge server, etc.) for implementing any of the techniques described herein. The device 2050 may include any combinations of the components shown in the example or referenced in the disclosure above. The components may be implemented as ICs, portions thereof, discrete electronic devices, or other modules, logic, hardware, software, firmware, or a combination thereof adapted in the device 2050, or as components otherwise incorporated within a chassis of a larger system. Additionally, the block diagram of FIG. 20 is intended to depict a high-level view of components of the device 2050. However, some of the components shown may be omitted, additional components may be present, and different arrangement of the components shown may occur in other implementations.

The device 2050 may include processing circuitry in the form of a processor 2052, which may be a microprocessor, a multi-core processor, a multithreaded processor, an ultra-low voltage processor, an embedded processor, or other known processing elements. The processor 2052 may be a part of a system on a chip (SoC) in which the processor 2052 and other components are formed into a single integrated circuit, or a single package, such as the Edison™ or Galileo™ SoC boards from Intel. As an example, the processor 2052 may include an Intel®) Architecture Core™ based processor, such as a Quark™, an Atom™, an i3, an i5, an i7, or an MCU-class processor, or another such processor available from Intel(Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 2052 may communicate with a system memory 2054 over an interconnect 2056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (ODP). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2058 may also couple to the processor 2052 via the interconnect 2056. In an example the storage 2058 may be implemented via a solid state disk drive (SSDD). Other devices that may be used for the storage 2058 include flash memory cards, such as SD cards, microSD cards, xD picture cards, and the like, and USB flash drives. In low power implementations, the storage 2058 may be on-die memory or registers associated with the processor 2052. However, in some examples, the storage 2058 may be implemented using a micro hard disk drive (HDD). Further, any number of new technologies may be used for the storage 2058 in addition to, or instead of, the technologies described, such resistance change memories, phase change memories, holographic memories, or chemical memories, among others.

The components may communicate over the interconnect 2056. The interconnect 2056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2056 may be a proprietary bus, for example, used in a SoC based system. Other bus systems may be included, such as an I2C interface, an SPI interface, point to point interfaces, and a power bus, among others.

The interconnect 2056 may couple the processor 2052 to a mesh transceiver 2062, for communications with other mesh devices 2064. The mesh transceiver 2062 may use any number of frequencies and protocols, such as 2.4 Gigahertz (GHz) transmissions under the IEEE 802.15.4 standard, using the Bluetooth®® low energy (BLE) standard, as defined by the Bluetooth, Special Interest Group, or the ZigBee® standard, among others. Any number of radios, configured for a particular wireless communication protocol, may be used for the connections to the mesh devices 2064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 2062 may communicate using multiple standards or radios for communications at different range. For example, the device 2050 may communicate with close devices, e.g., within about 10 meters, using a local transceiver based on BLE, or another low power radio, to save power. More distant mesh devices 2064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 2066 may be included to communicate with devices or services in the cloud 2000 via local or wide area network protocols. The wireless network transceiver 2066 may be a LPWA transceiver that follows the IEEE 802.15.4, or IEEE 802.15.4g standards, among others. The device 2050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 2062 and wireless network transceiver 2066, as described herein. For example, the radio transceivers 2062 and 2066 may include an LTE or other cellular transceiver that uses spread spectrum (SPA/SAS) communications for implementing high speed communications. Further, any number of other protocols may be used, such as Wi-Fit networks for medium speed communications and provision of network communications.

The radio transceivers 2062 and 2066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 2066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 2068 may be included to provide a wired communication to the cloud 2000 or to other devices, such as the mesh devices 2064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 2068 may be included to enable connect to a second network, for example, a NIC 2068 providing communications to the cloud over Ethernet, and a second NIC 2068 providing communications to other devices over another type of network.

Given the variety of types of applicable communications from the device to another component or network, applicable communications circuitry used by the device may include or be embodied by any one or more of components 2062, 2066, 2068, or 2070. Accordingly, in various examples, applicable means for communicating (e.g., receiving, transmitting, etc.) may be embodied by such communications circuitry.

The interconnect 2056 may couple the processor 2052 to an external interface 2070 that is used to connect external devices or subsystems. The external devices may include sensors 2072, such as accelerometers, level sensors, flow sensors, optical light sensors, camera sensors, temperature sensors, a global positioning system (GPS) sensors, pressure sensors, barometric pressure sensors, and the like. The external interface 2070 further may be used to connect the device 2050 to actuators 2074, such as power switches, valve actuators, an audible sound generator, a visual warning device, and the like.

In some optional examples, various input/output (I/O) devices may be present within, or connected to, the device 2050. For example, a display or other output device 2084 may be included to show information, such as sensor readings or actuator position. An input device 2086, such as a touch screen or keypad may be included to accept input. An output device 2084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the device 2050.

A battery 2076 may power the device 2050, although in examples in which the device 2050 is mounted in a fixed location, it may have a power supply coupled to an electrical grid. The battery 2076 may be a lithium ion battery, or a metal-air battery, such as a zinc-air battery, an aluminum-air battery, a lithium-air battery, and the like.

A battery monitor/charger 2078 may be included in the device 2050 to track the state of charge (SoCh) of the battery 2076. The battery monitor/charger 2078 may be used to monitor other parameters of the battery 2076 to provide failure predictions, such as the state of health (SoH) and the state of function (SoF) of the battery 2076. The battery monitor/charger 2078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 2078 may communicate the information on the battery 2076 to the processor 2052 over the interconnect 2056. The battery monitor/charger 2078 may also include an analog-to-digital (ADC) convertor that enables the processor 2052 to directly monitor the voltage of the battery 2076 or the current flow from the battery 2076. The battery parameters may be used to determine actions that the device 2050 may perform, such as transmission frequency, mesh network operation, sensing frequency, and the like.

A power block 2080, or other power supply coupled to a grid, may be coupled with the battery monitor/charger 2078 to charge the battery 2076. In some examples, the power block 2080 may be replaced with a wireless power receiver to obtain the power wirelessly, for example, through a loop antenna in the device 2050. A wireless battery charging circuit, such as an LTC4020 chip from Linear Technologies of Milpitas, Calif., among others, may be included in the battery monitor/charger 2078. The specific charging circuits chosen depend on the size of the battery 2076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2058 may include instructions 2082 in the form of software, firmware, or hardware commands to implement the techniques described herein. Although such instructions 2082 are shown as code blocks included in the memory 2054 and the storage 2058, it may be understood that any of the code blocks may be replaced with hardwired circuits, for example, built into an application specific integrated circuit (ASIC).

In an example, the instructions 2082 provided via the memory 2054, the storage 2058, or the processor 2052 may be embodied as a non-transitory, machine readable medium 2060 including code to direct the processor 2052 to perform electronic operations in the device 2050. The processor 2052 may access the non-transitory, machine readable medium 2060 over the interconnect 2056. For instance, the non-transitory, machine readable medium 2060 may be embodied by devices described for the storage 2058 or may include specific storage units such as optical disks, flash drives, or any number of other hardware devices. The non-transitory, machine-readable medium 2060 may include instructions to direct the processor 2052 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus, comprising: processing circuitry; and a memory device including instructions embodied thereon, wherein the instructions, which when executed by the processing circuitry, configure the processing circuitry to perform operations to: provide service level agreement (SLA) information for an edge service to an operational device, the edge service hosted in an edge computing environment, wherein the SLA information includes, reputation information for computing functions of the edge service according to an identified SLA: receive, from the operational device, a service request for use of the computing functions of the edge service, under the identified SLA; request, from the edge service, performance of the computing functions of the edge service according to the service request; and track the performance of the computing functions of the edge service according to the service request and compliance with the identified SLA.

In Example 2, the subject matter of Example 1 includes, subject matter where the edge service is operated by an edge service provider, wherein the computing functions of the edge service are associated with a defined edge service type, and wherein the SLA information further includes reputation information for performance of computing functions of other edge services of the defined edge service type, operated by the edge service provider, under the identified SLA.

In Example 3, the subject matter of Example 2 includes, the processing circuitry further configured to perform operations, prior to the providing of the SLA information, to: receive, from the operational device, a request for the SLA information, the request including a specification of a reputation score for a respective edge service from a respective edge service provider; and obtain, from a reputation information provider, a listing of at least one edge service that matches the reputation score for the respective edge service, operated by a service provider that matches the reputation score for the respective edge service provider: wherein the SLA information provided to the operational device includes reputation information for the edge service provider according to the identified SLA; and wherein the service request is provided to the apparatus in response to acceptance of the identified SLA by the operational device.

In Example 4, the subject matter of Example 3 includes, subject matter where the reputation information provider is a reputation service or a distributed blockchain ledger maintained by a third party entity.

In Example 5, the subject matter of Examples 1-4 includes, subject matter where the reputation information includes a numerical reputation score, the processing circuitry further configured to perform operations to: obtain the numerical reputation score, from a reputation service, for the computing functions of the edge service; and select the edge service, from among a plurality of available edge services based on the numerical reputation score, for use with the identified SLA.

In Example 6, the subject matter of Example 5 includes, subject matter where the reputation service utilizes a blockchain distributed ledger, wherein data is obtained from the blockchain distributed ledger to identify the reputation information.

In Example 7, the subject matter of Example 6 includes, subject matter where the reputation information is derived from task statistics of the edge service written to the blockchain distributed ledger, wherein the task statistics are based on telemetry of computing functions used by the edge service.

In Example 8, the subject matter of Examples 1-7 includes, subject matter where the performance of the computing functions of the edge service includes performance of at least one task, wherein performance of the at least one task causes an update to a reputation score of the edge service based on conditions associated with performance of the at least one task, and an update to a reputation score of an edge service provider associated with the edge service based on conditions associated with performance of the at least one task.

In Example 9, the subject matter of Example 8 includes, subject matter where the performance of the edge service causes an update to a reputation score of the identified SLA, wherein the reputation score of the identified SLA provides an aggregation of multiple scores from performance of the at least one task among multiple edge services.

In Example 10, the subject matter of Examples 1-9 includes, subject matter where the apparatus is an orchestrator operable among a plurality of edge computing nodes in the edge computing environment, wherein computing functions of respective edge services are available among the plurality of edge computing nodes according to computing capabilities identified by the orchestrator to fulfill the SLA.

In Example 11, the subject matter of Examples 1-10 includes, subject matter where the apparatus is provided by an orchestrator in a MEC (Multi-Access Edge Computing) system, wherein the operational device is a UE communicatively coupled to the MEC system, and wherein the edge service is provided by a MEC host in the MEC system.

In Example 12, the subject matter of Example 11 includes, subject matter where the apparatus is a road side unit (RSU) operating as an infrastructure component of a vehicle communications environment, and wherein the operational device is provided from the UE operating in a motor vehicle, wherein the UE specifies a minimum acceptable rating for an aspect of the service to be fulfilled by the edge service via the SLA.

Example 13 is a method, performed by an orchestrator computing system in an edge computing environment, comprising: communicating service level agreement (SLA) information for an edge service to an operational device, the edge service hosted in an edge computing environment, wherein the SLA information includes, reputation information for computing functions of the edge service according to an identified SLA; receiving, from the operational device, a service request for use of the computing functions of the edge service, under the identified SLA; requesting, from the edge service, performance of the computing functions of the edge service according to the service request; and tracking the performance of the computing functions of the edge service according to the service request and compliance with the identified SLA.

In Example 14, the subject matter of Example 13 includes, subject matter where the edge service is operated by an edge service provider, wherein the computing functions of the edge service are associated with a defined edge service type, and wherein the SLA information further includes reputation information for performance of computing functions of other edge services of the defined edge service type, operated by the edge service provider, under the identified SLA.

In Example 15, the subject matter of Example 14 includes, operations, performed prior to the providing of the SLA information, including: receiving, from the operational device, a request for the SLA information, the request including a specification of a reputation score for a respective edge service from a respective edge service provider; and obtaining, from a reputation information provider, a listing of at least one edge service that matches the reputation score for the respective edge service, operated by a service provider that matches the reputation score for the respective edge service provider; wherein the SLA information provided to the operational device includes reputation information for the edge service provider according to the identified SLA; and wherein the service request is provided to the computing system in response to acceptance of the identified SLA by the operational device.

In Example 16, the subject matter of Example 15 includes, subject matter where the reputation information provider is a reputation service or a distributed blockchain ledger maintained by a third party entity.

In Example 17, the subject matter of Examples 13-16 includes, subject matter where the reputation information includes a numerical reputation score, the method further comprising: obtaining the numerical reputation score, from a reputation service, for the computing functions of the edge service; and selecting the edge service, from among a plurality of available edge services based on the numerical reputation score, for use with the identified SLA.

In Example 18, the subject matter of Example 17 includes, subject matter where the reputation service utilizes a blockchain distributed ledger, wherein data is obtained from the blockchain distributed ledger to identify the reputation information.

In Example 19, the subject matter of Example 18 includes, subject matter where the reputation information is derived from task statistics of the edge service written to the blockchain distributed ledger, wherein the task statistics are based on telemetry of computing functions used by the edge service.

In Example 20, the subject matter of Examples 13-19 includes, subject matter where the performance of the computing functions of the edge service includes performance of at least one task, wherein performance of the at least one task causes an update to a reputation score of the edge service based on conditions associated with performance of the at least one task, and an update to a reputation score of an edge service provider associated with the edge service based on conditions associated with performance of the at least one task.

In Example 21, the subject matter of Example 20 includes, subject matter where the performance of the edge service causes an update to a reputation score of the identified SLA, wherein the reputation score of the identified SLA provides an aggregation of multiple scores from performance of the at least one task among multiple edge services.

In Example 22, the subject matter of Examples 13-21 includes, subject matter where the computing system provides orchestration functions among a plurality of edge computing nodes in the edge computing environment, wherein computing functions of respective edge services are available among the plurality of edge computing nodes according to computing capabilities identified by the orchestrator to fulfill the SLA.

In Example 23, the subject matter of Examples 13-22 includes, subject matter where the computing system provides orchestration functions in a MEC (Multi-Access Edge Computing) system, wherein the operational device is a UE communicatively coupled to the MEC system, and wherein the edge service is provided by a MEC host in the MEC system.

In Example 24, the subject matter of Example 23 includes, subject matter where the computing system is embodied by a road side unit (RSU) operating as an infrastructure component of a vehicle communications environment, and wherein the operational device is provided from the UE operating in a motor vehicle, wherein the UE specifies a minimum acceptable rating for an aspect of the service to be fulfilled by the edge service via the SLA.

Example 25 is at least one machine-readable storage device comprising instructions stored thereupon, which when executed by a processing circuitry of a computing device, cause the processing circuitry to: provide service level agreement (SLA) information for an edge service to an operational consumer device, the edge service hosted in an edge computing environment, wherein the SLA information includes, reputation information for computing functions of the edge service according to an identified SLA: receive, from the operational consumer device, a service request for use of the computing functions of the edge service, under the identified SLA; request, from the edge service, performance of the computing functions of the edge service according to the service request; and track the performance of the computing functions of the edge service according to the service request and compliance with the identified SLA; wherein the edge service is operated by an edge service provider, wherein the computing functions of the edge service are associated with a defined edge service type; and wherein the SLA information further includes reputation information for performance of computing functions of other edge services of the defined edge service type, operated by the edge service provider, under the identified SLA.

Example 26 is at least one machine-readable storage medium including instructions, wherein the instructions, when executed by a processing circuitry of a computing device, cause the processing circuitry to perform operations of any of Examples 13 to 24.

Example 27 is an apparatus, comprising: means for communicating service level agreement (SLA) information for an edge service to an operational device, the edge service hosted in an edge computing environment, wherein the SLA information includes, reputation information for computing functions of the edge service according to an identified SLA; means for receiving, from the operational device, a service request for use of the computing functions of the edge service, under the identified SLA: means for requesting, from the edge service, performance of the computing functions of the edge service according to the service request; and means for tracking the performance of the computing functions of the edge service according to the service request and compliance with the identified SLA.

In Example 28, the subject matter of Example 27 includes, subject matter where the edge service is operated by an edge service provider, wherein the computing functions of the edge service are associated with a defined edge service type, and wherein the SLA information further includes reputation information for performance of computing functions of other edge services of the defined edge service type, operated by the edge service provider, under the identified SLA.

In Example 29, the subject matter of Example 28 includes, means for receiving, from the operational device, a request for the SLA information, the request including a specification of a reputation score for a respective edge service from a respective edge service provider; and means for obtaining, from a reputation information provider, a listing of at least one edge service that matches the reputation score for the respective edge service, operated by a service provider that matches the reputation score for the respective edge service provider; wherein the SLA information provided to the operational device includes reputation information for the edge service provider according to the identified SLA; and wherein the service request is provided to the computing system in response to acceptance of the identified SLA by the operational device.

In Example 30, the subject matter of Example 29 includes, subject matter where the reputation information provider is a reputation service or a distributed blockchain ledger maintained by a third party entity.

In Example 31, the subject matter of Examples 27-30 includes, subject matter where the reputation information includes a numerical reputation score, the apparatus further comprising: means for obtaining the numerical reputation score, from a reputation service, for the computing functions of the edge service; and means for selecting the edge service, from among a plurality of available edge services based on the numerical reputation score, for use with the identified SLA.

In Example 32, the subject matter of Example 31 includes, subject matter where the reputation service utilizes a blockchain distributed ledger, wherein data is obtained from the blockchain distributed ledger to identify the reputation information.

In Example 33, the subject matter of Example 32 includes, subject matter where the reputation information is derived from task statistics of the edge service written to the blockchain distributed ledger, wherein the task statistics are based on telemetry of computing functions used by the edge service.

In Example 34, the subject matter of Examples 27-33 includes, subject matter where the performance of the computing functions of the edge service includes performance of at least one task, wherein performance of the at least one task causes an update to a reputation score of the edge service based on conditions associated with performance of the at least one task, and an update to a reputation score of an edge service provider associated with the edge service based on conditions associated with performance of the at least one task.

In Example 35, the subject matter of Example 34 includes, subject matter where the performance of the edge service causes an update to a reputation score of the identified SLA, wherein the reputation score of the identified SLA provides an aggregation of multiple scores from performance of the at least one task among multiple edge services.

In Example 36, the subject matter of Examples 27-35 includes, subject matter where the computing system provides orchestration functions among a plurality of edge computing nodes in the edge computing environment, wherein computing functions of respective edge services are available among the plurality of edge computing nodes according to computing capabilities identified by the orchestrator to fulfill the SLA.

In Example 37, the subject matter of Examples 27-36 includes, subject matter where the computing system provides orchestration functions in a MEC (Multi-Access Edge Computing) system, wherein the operational device is a UE communicatively coupled to the MEC system, and wherein the edge service is provided by a MEC host in the MEC system.

In Example 38, the subject matter of Example 37 includes, subject matter where the computing system is embodied by a road side unit (RSU) operating as an infrastructure component of a vehicle communications environment, and wherein the operational device is provided from the UE operating in a motor vehicle, wherein the UE specifies a minimum acceptable rating for an aspect of the service to be fulfilled by the edge service via the SLA.

Example 39 is an apparatus comprising means to perform one or more elements of a method described in or related to any of Examples 13-25.

Example 40 is at least one machine-readable storage medium, comprising information representative of instructions that, when executed by processing circuitry, cause the processing circuitry to, perform the operations of any of Examples 1-39.

Example 41 is one or more non-transitory computer-readable media comprising instructions to cause an electronic device, upon execution of the instructions by one or more processors of the electronic device, to perform one or more elements of a method described in or related to any of Examples 1-39, or any other method or process described herein.

Example 42 is an apparatus comprising logic, modules, or circuitry to perform one or more elements of a method described in or related to any of Examples 1-39, or any other method or process described herein.

Example 43 is a method, technique, or process as described in or related to any of Examples 1-39.

Example 44 is an apparatus comprising: one or more processors and one or more computer readable media comprising instructions that, when executed by the one or more processors, cause the one or more processors to perform the method, techniques, or process as described in or related to any of Examples 1-39.

Example 45 is a signal as described in or related to any of Examples 1-39.

Example 46 is a signal in a wireless network as described in or related to any of Examples 1-39.

Example 47 is a method of coordinating communications in a wireless network as described in or related to any of Examples 1-39.

Example 48 is a device for processing communication as described in or related to any of Examples 1-39.

Example 49 is a network comprising respective devices and device communication mediums for performing any of the operations of Examples 1-39.

Example 50 is an edge cloud computing device implementation comprising processing nodes and computing units adapted for performing any of the operations of Examples 1-39.

Example 51 is an ETSI MEC system implementation comprising devices, processing nodes, and computing units adapted for performing any of the operations of Examples 1-39.

Example 52 is a MEC system implementation, including respective MEC entities including MEC hosts, MEC platforms, and orchestrator, adapted for performing any of the operations of Examples 1-39.

Example 53 is an Internet of Things (IoT) system implementation, including respective endpoint devices, intermediate nodes, and processing resources, adapted for performing any of the operations of Examples 1-39.

Example 54 is an edge cloud network platform comprising physical and logical computing resources adapted for performing any of the operations of Examples 1-39.

Example 55 is an apparatus comprising respective means for performing any of the operations of Examples 1-54.

Example 56 is a system to perform the operations of any of Examples 1-54.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An apparatus, comprising:
    processing circuitry; and
    a memory device including instructions embodied thereon, wherein the instructions, which when executed by the processing circuitry, configure the processing circuitry to perform operations to:
    receive, from a network-connected device, a request for service level agreement (SLA) information, the request including a specification of a service reputation score and a service provider reputation score;
    obtain, from a reputation information provider, a listing of at least one edge service that satisfies the service reputation score, provided by a service provider that satisfies the service provider reputation score;
    provide the SLA information for an edge service in the list to the network-connected device, the edge service hosted in an edge computing environment, wherein the SLA information includes reputation information for the edge service and reputation information for the service provider that provides the edge service according to an identified SLA;
    receive, from the network-connected device, a service request for a service to be performed by the edge service, under the identified SLA, wherein the service request is provided to the apparatus in response to acceptance of the identified SLA by the network-connected device;
    request, from the edge service, performance of the service according to the service request, wherein performance of the service comprises performing a plurality of tasks;
    track the performance of each of the plurality of tasks by the edge service for compliance with the identified SLA;
    update the service provider reputation score of the service provider that provides the edge service each time the edge service performs a task of the plurality of tasks, based on conditions associated with performance of the task;
    communicate the updated service provider reputation score to at least one of the edge service, a second network-connected device, or a second service provider; and
    perform, based on the updated service provider reputation score, service adaptation or a service change, prior to completing the service request, wherein the service adaptation or service change includes performing at least one task of the plurality of tasks by an edge service provided by the second service provider instead of performing the at least one task by the edge service.

2. The apparatus of claim 1, wherein the edge service is operated by an edge service provider, wherein one or more computing functions of the edge service are associated with a defined edge service type, and wherein the SLA information further includes reputation information for performance of computing functions of other edge services of the defined edge service type, operated by the service provider, under the identified SLA.

3. The apparatus of claim 2, wherein the reputation information includes a numerical reputation score, the processing circuitry further configured to perform operations to:
    obtain the numerical reputation score, from a reputation service, for the one or more computing functions of the edge service; and
    select the edge service, from among a plurality of available edge services based on the numerical reputation score, for use with the identified SLA.

4. The apparatus of claim 3, wherein the reputation service utilizes a blockchain distributed ledger, wherein data is obtained from the blockchain distributed ledger to identify the reputation information.

5. The apparatus of claim 4, wherein the reputation information is derived from task statistics of the edge service written to the blockchain distributed ledger, wherein the task statistics are based on telemetry of computing functions used by the edge service.

6. The apparatus of claim 1, wherein the reputation information provider is a reputation service or a distributed blockchain ledger maintained by a third party entity.

7. The apparatus of claim 1, wherein the performance of the edge service causes an update to a reputation score of the identified SLA, wherein the reputation score of the identified SLA provides an aggregation of multiple scores from performance of the plurality of tasks among multiple edge services.

8. The apparatus of claim 1, wherein the apparatus is an orchestrator operable among a plurality of edge computing nodes in the edge computing environment, wherein computing functions of respective edge services are available among the plurality of edge computing nodes according to computing capabilities identified by the orchestrator to fulfill the SLA.

9. The apparatus of claim 1, wherein the apparatus is provided by an orchestrator in a MEC (Multi-Access Edge Computing) system, wherein the network-connected device is a UE communicatively coupled to the MEC system, and wherein the edge service is provided by a MEC host in the MEC system.

10. The apparatus of claim 9, wherein the apparatus is a roadside unit (RSU) operating as an infrastructure component of a vehicle communications environment, and wherein the device is provided from the UE operating in a motor vehicle, wherein the UE specifies a minimum acceptable rating for an aspect of the service to be fulfilled by the edge service via the SLA.

11. The apparatus of claim 1, wherein the service adaptation or service change occurs before all tasks of the plurality of tasks has been completed.

12. A method, performed by an orchestrator computing system in an edge computing environment, comprising:
    receiving, from a network connected device, a request for service level agreement (SLA) information, the request including a specification of a service reputation score and a service provider reputation score;
    obtaining, from a reputation information provider, a listing of at least one edge service that satisfies the service reputation score, provided by a service provider that satisfies the service provider reputation score;
    communicating the SLA information for an edge service in the list to the network-connected device, the edge service hosted in an edge computing environment, wherein the SLA information includes reputation information for the edge service and reputation information for the service provider that provides the edge service according to an identified SLA;

receiving, from the network-connected device, a service request for a service to be performed by the edge service, under the identified SLA, wherein the service request is provided to the orchestrator computing system in response to acceptance of the identified SLA by the network-connected device;

requesting, from the edge service, performance of the service according to the service request, wherein performance of the service comprises performing a plurality of tasks;

tracking the performance of each of the plurality of tasks by the edge service for compliance with the identified SLA;

updating the service provider reputation score of an edge the service provider that provides the edge service each time the edge service performs a task of the plurality of tasks, based on conditions associated with performance of the task;

communicating the updated service provider reputation score to at least one of the edge service, a second network-connected device, or a second service provider; and performing, based on the updated service provider reputation score a service adaptation or a service change prior to completing the service request, wherein the service adaptation or service change includes performing at least one task of the plurality of tasks by an edge service provided by the second service provider instead of performing the at least one task by the edge service.

13. The method of claim 12, wherein the edge service is operated by an edge service provider, wherein one or more computing functions of the edge service are associated with a defined edge service type, and wherein the SLA information further includes reputation information for performance of computing functions of other edge services of the defined edge service type, operated by the edge service provider, under the identified SLA.

14. The method of claim 13, wherein the reputation information includes a numerical reputation score, the method further comprising:

obtaining the numerical reputation score, from a reputation service, for the one or more computing functions of the edge service; and selecting the edge service, from among a plurality of available edge services based on the numerical reputation score, for use with the identified SLA.

15. The method of claim 14, wherein the reputation service utilizes a blockchain distributed ledger, wherein data is obtained from the blockchain distributed ledger to identify the reputation information.

16. The method of claim 15, wherein the reputation information is derived from task statistics of the edge service written to the blockchain distributed ledger, wherein the task statistics are based on telemetry of computing functions used by the edge service.

17. The method of claim 12, wherein the reputation information provider is a reputation service or a distributed blockchain ledger maintained by a third party entity.

18. The method of claim 12, wherein the performance of the edge service causes an update to a reputation score of the identified SLA, wherein the reputation score of the identified SLA provides an aggregation of multiple scores from performance of the plurality of tasks among multiple edge services.

19. The method of claim 12, wherein the orchestrator computing system provides orchestration functions among a plurality of edge computing nodes in the edge computing environment, wherein computing functions of respective edge services are available among the plurality of edge computing nodes according to computing capabilities identified by the orchestrator to fulfill the SLA.

20. The method of claim 12, wherein the computing system provides orchestration functions in a MEC (Multi-Access Edge Computing) system, wherein the network-connected device is a UE communicatively coupled to the MEC system, and wherein the edge service is provided by a MEC host in the MEC system.

21. The method of claim 12, wherein the service adaptation or service change occurs before all tasks of the plurality of tasks has been completed.

22. At least one non-transitory machine-readable storage device comprising instructions stored thereupon, which when executed by a processing circuitry of a computing device, cause the processing circuitry to:

receive, from a network-connected consumer device, a request for service level agreement (SLA) information, the request including a specification of a service reputation score and a service provider reputation score;

obtain, from a reputation information provider, a listing of at least one edge service that satisfies the service reputation score performed by a service provider that satisfies the service provider reputation;

provide the SLA information for an edge service in the list to the network-connected consumer device, the edge service hosted in an edge computing environment, wherein the SLA information includes reputation information for the edge service and reputation information for the service provider that provides the edge service according to an identified SLA;

receive, from the network-connected consumer device, a service request for a service to be performed by the edge service, under the identified SLA, wherein the service request is provided to the computing device in response to acceptance of the identified SLA by the network-connected consumer device;

request, from the edge service, performance of the service according to the service request, wherein performance of the service comprises performing a plurality of tasks;

track the performance of each of the plurality of tasks by the edge service for compliance with the identified SLA;

update the service provider reputation score of the service provider that provides the edge service each time the edge service performs a task of the plurality of tasks, based on conditions associated with performance of the task;

communicate the updated service provider reputation score to at least one of the edge service, a second network-connected consumer device, or a second service provider; and perform, based on the updated service provider reputation score, a service adaptation or a service change prior to completing the service request, wherein the service adaptation or service change includes performing at least one task of the plurality of tasks by an edge service provided by the second service provider instead of performing the at least one task by the edge service.

23. The machine-readable storage device of claim 22, wherein the SLA information further includes reputation information for performance of one or more computing functions of other edge services of a defined edge service type, operated by the service provider, under the identified SLA.

24. The machine-readable storage device of claim 22, wherein the service adaptation or service change occurs before all tasks of the plurality of tasks has been completed.

* * * * *

UNITED STATES PATENT AND TRADEMARK OFFICE
CERTIFICATE OF CORRECTION

| | |
|---|---|
| PATENT NO. | : 11,611,491 B2 |
| APPLICATION NO. | : 16/235159 |
| DATED | : March 21, 2023 |
| INVENTOR(S) | : Smith et al. |

It is certified that error appears in the above-identified patent and that said Letters Patent is hereby corrected as shown below:

In the Claims

In Column 39, Line 57, in Claim 1, before "service", insert --a--

In Column 41, Line 17, in Claim 12, after "score of", delete "an edge"

Signed and Sealed this
Eleventh Day of June, 2024

Katherine Kelly Vidal
*Director of the United States Patent and Trademark Office*